(12) United States Patent
Whitham et al.

(10) Patent No.: US 12,368,755 B2
(45) Date of Patent: Jul. 22, 2025

(54) METHODS AND SYSTEMS FOR HONEYFILE CREATION, DEPLOYMENT, AND MANAGEMENT

(71) Applicant: Penten Pty Ltd, Braddon (AU)

(72) Inventors: Ben Whitham, Campbell (AU); David Liebowitz, Bruce (AU); Kiriya Keat, Narrabundah (AU); Connor Brendish, Nicholls (AU)

(73) Assignee: Penten Pty Ltd, Braddon (AU)

( * ) Notice: Subject to any disclaimer, the term of this patent is extended or adjusted under 35 U.S.C. 154(b) by 663 days.

(21) Appl. No.: 17/752,024

(22) Filed: May 24, 2022

(65) Prior Publication Data

US 2022/0286478 A1 Sep. 8, 2022

Related U.S. Application Data

(63) Continuation-in-part of application No. 17/352,251, filed on Jun. 18, 2021, now Pat. No. 11,689,569, (Continued)

(30) Foreign Application Priority Data

Oct. 9, 2018 (AU) ................................ 2018247212

(51) Int. Cl.
*H04L 29/06* (2006.01)
*G06F 21/56* (2013.01)
(Continued)

(52) U.S. Cl.
CPC ........ *H04L 63/1491* (2013.01); *G06F 21/565* (2013.01); *G06F 21/566* (2013.01);
(Continued)

(58) Field of Classification Search
CPC . H04L 63/1491; H04L 63/1416; H04L 29/06; G06F 21/565; G06F 21/566;
(Continued)

(56) References Cited

U.S. PATENT DOCUMENTS 9,501,639 B2 11/2016 Stolfo et al.
9,992,259 B2 * 6/2018 Lind ....................... H04L 67/10
(Continued)

OTHER PUBLICATIONS

Bowen, et al., "Baiting inside attackers using decoy documents" 5th International ICST Conference, SecureComm 2009, Athens, Greece; Sep. 2009 https://www.cs.columbia.edu/-amzelos/Papers/2009/DecoyDocumentsSECCOM09.pdf, 10 pages.
(Continued)

*Primary Examiner* — Quazi Farooqui
(74) *Attorney, Agent, or Firm* — Nutter McClennen & Fish LLP

(57) ABSTRACT

A method of automatically manipulating a lifecycle of a honeyfile on a file system, includes: implementing a learning algorithm on a file system; identifying a real file; training the learning algorithm by observing temporal events involving the real file; training a model with the learning algorithm; implementing a user agent on the file system; creating a honeyfile on the file system; deploying the honeyfile on the file system; using the trained model to generate user agent actions; evaluating the honeyfile; and either: deleting the honeyfile; or re-using the trained model to generate user agent actions to automatically modify the honeyfile.

20 Claims, 38 Drawing Sheets

Related U.S. Application Data which is a continuation of application No. 16/596,139, filed on Oct. 8, 2019, now Pat. No. 11,330,015.

(51) Int. Cl.
*G06F 21/62* (2013.01)
*H04L 9/40* (2022.01)
*G06Q 10/10* (2023.01)

(52) U.S. Cl.
CPC .... *G06F 21/6218* (2013.01); *G06F 2221/034* (2013.01); *G06Q 10/10* (2013.01)

(58) Field of Classification Search
CPC .......... G06F 21/6218; G06F 2221/034; G06F 21/552; G06F 40/284; G06F 21/64; G06F 21/56; G06F 21/62; G06Q 10/10; G06N 5/02
See application file for complete search history.

(56) References Cited

U.S. PATENT DOCUMENTS

| | | |
|---|---|---|
| 10,515,214 B1 | 12/2019 | Vincent et al. |
| 10,574,698 B1 | 2/2020 | Sharifi Mehr |
| 10,686,836 B1 | 6/2020 | Stolfo |
| 11,144,656 B1 | 10/2021 | Banerjee et al. |
| 2009/0249082 A1 | 10/2009 | Mattsson |
| 2010/0269175 A1 | 10/2010 | Stolfo et al. |
| 2012/0246724 A1 | 9/2012 | Sheymov et al. |
| 2015/0302218 A1 | 10/2015 | Fielder |
| 2016/0180087 A1 | 6/2016 | Edwards et al. |
| 2016/0379289 A1 | 12/2016 | More |
| 2017/0104785 A1 | 4/2017 | Stolfo et al. |
| 2018/0324213 A1 | 11/2018 | Borlick et al. |
| 2019/0034083 A1 | 1/2019 | Cherubini et al. |
| 2019/0052675 A1 | 2/2019 | Krebs |
| 2019/0098032 A1 | 3/2019 | Murphey et al. |
| 2019/0190951 A1 | 6/2019 | Myron et al. |
| 2020/0050773 A1 | 2/2020 | Schroeder et al. |
| 2020/0053120 A1 | 2/2020 | Wilcox |
| 2020/0204590 A1 | 6/2020 | Whitham et al. |
| 2021/0067552 A1 | 3/2021 | Hebert et al. |
| 2021/0314356 A1 | 10/2021 | Whitham et al. |
| 2022/0004532 A1 | 1/2022 | Portisch et al. |
| 2022/0255962 A1 | 8/2022 | Liebowitz et al. |
| 2022/0286478 A1 | 9/2022 | Whitham et al. |
| 2024/0106846 A1* | 3/2024 | Kapoor .................. H04L 63/10 |

OTHER PUBLICATIONS

Abay, N., et al., "Using Deep Leaning to Generate Relational HoneyData," ResearchGate, Dec. 2018 (17 pages).

[No Author Listed] "Lost in Translation: Improving Decoy Documents via Automated translation", IEEE CS Security and Privacy Workshops, Voris, Boggs, Stolfo, Dept. of Computer Science, Columbia University, © 2012, Jonathan Voris, Under license to IEEE, pp. 129-133, downloaded Jun. 29, 2020.

Bown, et al., "Baiting inside attackers using decoy documents" 5th International ICST Conference, SecureComm 2009, Athens, Greece; Sep. 2009 https://www.cs.columbia.edu/-amzelos/Papers/2009/DecoyDocumentsSECCOM09.pdf, 10 pages.

EP 19202330.7, Extended European Search Report dated Feb. 21, 2020, 8 pages—English.

Voris, et al., "Bait and Snitch: Defending Computer Systems with Decoys" Proceedings of the cyber infrastructure protection conference, Strategic Studies Institute; Sep. 2013 http://ids.cs.columbia.edu/sites/default/files/ssi.pdf. pp. 1-25.

Voris, et al., "Fox in the Trap: Thwarting Masqueraders via Automated Decoy Document Deployment" Presented at the European Workshop on System Security (EuroSec); Jul. 14, 2015. http://ids.cs.columbia.edu/sites/default/files/eurosec,_15_0.pdf, 7 pages.

Voris, et al., "Lost in Translation: Improving Decoy Documents via Automated Translation" IEEE CS Security and Privacy Workshops: SPW 2012: Proceedings: San Francisco, California, USA; May 24, 2012 https://ieeexplore.ieee.org/document/6227696, pp. 129-133.

Whitman, "Automating the generation of enticing text content for high-interaction honeyfiles." In Proceedings of the 50th Hawaii International Conference on System Sciences; Jan. 1, 2017, pp. 6069-6078.

Whitman, "Automating the Generation of Fake Documents to Detect Network Intruders" International Journal of Cyber-Security and Digital Forensics, vol. 2, No. 1, 2013, p. 103-118.

Whitman, "Canary Files: Generating Fake Files to Detect Critical Data Loss From Complex Computer Networks" in Conference: The Second International Conference on Cyber Security, Cyber Peacefare and Digital Forensic (CyberSec2013); Mar. 2013 https://pdfs.semanticscholar.org/daf9/875773176e8527381634616b2ad1be75aaf9.pdf, pp. 1-5.

Yuill, et al., "Honeyfiles: Deceptive Files for Intrusion Detection" In Proceedings of the 2004 IEEE Workshop on Information Assurance, U.S. Military Academy, West Point, NY; Jun. 2004. https://calhoun.nps.edu/handle/10945/37180, 7 pages.

* cited by examiner

| strings | 2016 | S | SecureWirelessArchitecture | & | | S | page | 1 | S | 1 | N |
|---------|------|---|---|---|---|---|---|---|---|---|---|
| tags | N | S | T | | S | T | T | S | N | | |
| strings | 2016 | S | Secure Wireless Architecture | & | designoverview | S | page | 1 | S | 1 | N |
| tags | N | S | C | | S | L | L | S | N | | |
| strings | 2016 | S | Secure Wireless Architecture | & | design overview | S | page | N | S | 1 | N |
| tags | N | S | C | | S | N | N | S | N | | |

FIG 5

| filenames | NST | NsT | CLNsU | CLNsU | CNsU | CNsUW |
|---|---|---|---|---|---|---|
| acn_2010.45_september_2014.docx | TSNSNSTSN | T,N,N,T,N | LSNSNSLSN | L,N,N,L,N | WWSNSNSWSN | WW,N,N,W,N |
| acn-firearmschanges-november2010.docx | TSTSTN | T-T-TN | LSLSLN | L-L-LN | WWSWWSWN | WW-WW-WN |
| australiancustomsnotficatno2010-33.docx | TNSN | TN-N | LNSN | LN-N | WWWWNSN | WWWWN-N |
| acn2010-54.docx | TNSN | TN-N | LNSN | LN-N | WWNSN | WWN-N |
| acn_2010-07.docx | TSNSN | T,N-N | LSNSN | L,N-N | WVSNSN | WV,N-N |
| acn2010-13importsalestransaction.docx | TNSNT | TN-NT | LNSNL | LN-NL | WWNSNWWW | WWN-NWWWW |

FIG 7

| generated filename | signature template | method |
|---|---|---|
| firearmssales-acn-transaction33.docx | WW-WW-WN | CNsUW |
| firearmschanges45-2014november.docx | LN-NL | CLNsU |
| cnnotice_2010-45.docx | WW_N-N | CNsUW+CNSUW |
| a542014-2010.docx | WNN-N | CNsUW+CLNSU |

FIG 8

| (uid, gid, mode) |
| --- |
| (501, 20, 33188) |
| (501, 20, 33279) |
| (501, 20, 33188) |
| (501, 20, 33188) |
| (501, 20, 33188) |
| (501, 20, 33188) |
| (501, 20, 33188) |
| (501, 20, 33188) |
| (503, 20, 33188) |
| (501, 20, 33279) |
| (503, 20, 33152) |
| (501, 0, 33206) |
| (501, 20, 33261) |
| (501, 20, 33188) |
| (201, 201, 33152) |
| (201, 201, 33152) |

FIG 9

| (uid, gid, mode) | frequency | probability |
| --- | --- | --- |
| (501, 20, 33188) | 8 | .5 |
| (501, 20, 33279) | 2 | .125 |
| (503, 20, 33188) | 1 | .0625 |
| (503, 20, 33152) | 1 | .0625 |
| (501, 0, 33206) | 1 | .0625 |
| (501, 20, 33261) | 1 | .0625 |
| (201, 201, 33152) | 2 | .125 |

FIG 10

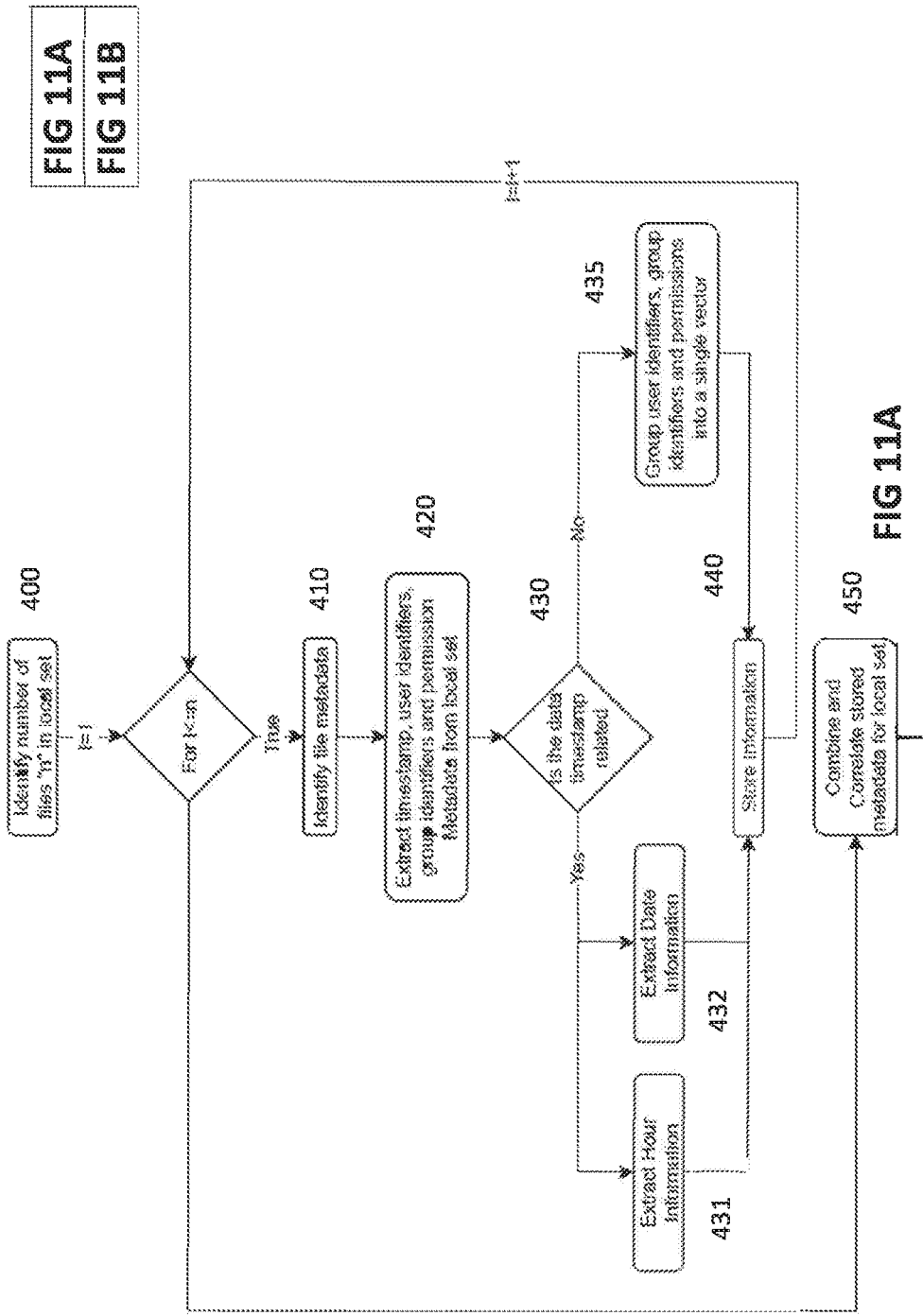

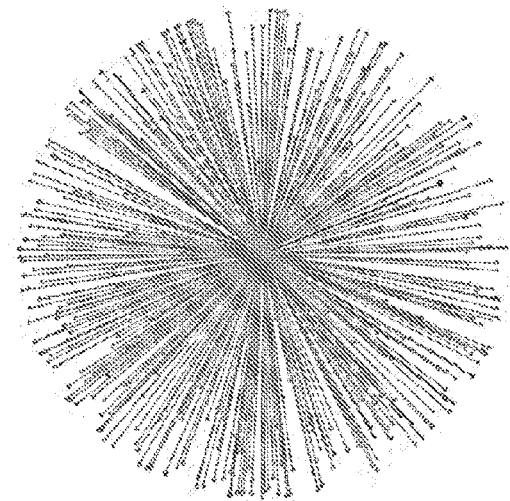
FIG 13 (a) Normalised vectors in three dimensions.
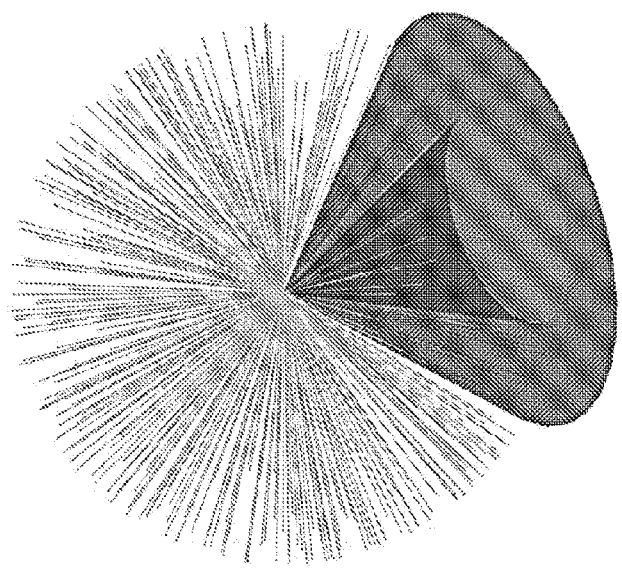
FIG 13 (b) Conic Selections

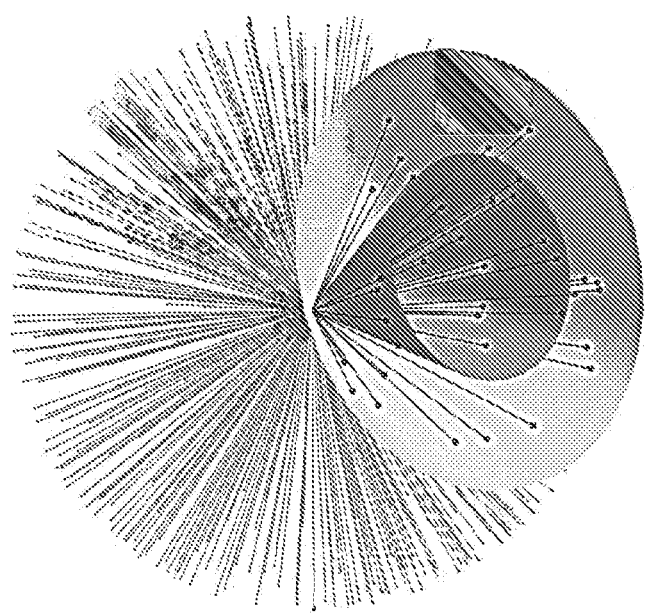
FIG 13 (c) Selected vectors in green

Normalised Inner Product v Rank for the first 2000 LGD embedding neighbours for the six example words Original text:

Self-balancing scooters are electrical two-wheeled ride on devices with no steering grips, seats or handlebars. They are powered by a lithium-ion battery that is rechargeable through connection to a main power supply.
The Australian Competition and Consumer Commission (ACCC), with relevant state and territory regulators are responsible for ensuring consumer goods comply with safety requirements. This includes self-balancing scooters sold in the Australian market. The Minister for Small Business, along with state and territory counterparts, is responsible for ensuring the safety of consumer goods sold domestically.
Self-balancing scooters have been associated with a number of house fires in Australia since January 2016. In response to safety concerns, the Minister for Small Business imposed an interim ban on self-balancing scooters that do not meet safety requirements. This followed advice from the ACCC on its findings during its safety investigation into self-balancing scooters and associated parts. The ban was extended twice and expired on 16 July 2016. The newly introduced mandatory safety standard has the same requirements as the interim ban.

FIG 15A

Text generated by part of speech tagged n-gram sequences:

Computer-saving rafts are liable two,electric adaptor for vehicles in this class libraries, concentrates and preparations, Themselves have applied to the applicant.circle cross that is similar to wrestling in this particular breach toy: The Australian Competition and Consumer Commission <ACCC>, for electronic discernment and video recordings go green in transmitting device computers form for recordingdevices, This operates computer.writing utensils included in this Australian currency. The Voti in Ics Apparatus, in by rect or square toys. has pointy from towelling a trade with house wares included anti-Water.playing games do made operated by those o in explosion snackfoods in Australia by January 2016, In class for recording strips, all Notice of Objection Arjila carbonated a substantial change in tariff,including shoes which have not precede toy banks, The mounted computer for all ACCC for their obligations in our risk assessment as laser,smiling plaques and aerated waters, This class made sold directly or referred to 16 July 2016- The currently approved minimal handling video is an off goods unless the Text generated by word replacement by sampling from a VSM, using a publicly available VSM:

Self-balancing autos are electrical two-wheeled ride coincidentally devices with no steering grips, seats or winglets. They are motorised by a caesium-ion ciws that is rechargeable through link-up to a main ascendency supply. The Australian Half-Marathon and Franchisor Commission (ACCC), with on-topic state and fief raters are sworn-in for ensuring foreign-policy fuelwood contravene with safety objectives. This includes self-righteousness-biasing scooters pawned in the Malawian entrepôt. The Atan for Small Haberdashery, along with state and territory forbears, is responsible for expediting the safety of us-china woodchips outsold bilaterally. Self-lightening scooters have been associated with a over-representation of hofje ejects in Australia since April-May 2016. In response to safety concerns, the Minister for Small Casework enjoined an interim de-sysop on intellect-differencing scooters that do not re-unite operability requirements. This followed assistance from the ACCC offensively its findings during its safety prosecution into darkforce-scrubbing scooters and interwoven parts. The unblock was extended twice and expired on 9 July 2016. The institutionally introduced mandatory ease-of-use standard has the same requirements as the interim ban.

FIG 15C

Text generated by word replacement using words from a local set (directory), tagged with the same part of speech:

1.

State-depending scooters are electrical two-arrange days on access with no input issues, seats or handlebars. They are can by a lithium-effect battery that is rechargeable through connection to a main level requirements.
The August New and Price Budget (ACCC), with relevant result and agreement regulators are responsible for ensuring pricing product comply with safety requirements. This set manner-calculating importers approved in the Australian market.
The Executive for Budget Business, along with state and territory counterparts, is responsible for increasing the education of consumer market sold domestically.
Self-simplify safety have been associated with a terms of house force in Chinese since Singapore 2016. In understanding to duty concerns, the Party for General Business imposed an interim treaty on result-facilitate importers that do not make policy requirements. This completed what from the ACCC on its findings during its safety investigation into self-balancing grips and associated product. The approval was extended twice and signed on 16 Korea 2016. The newly introduced mandatory vehicles standard has the same requirements as the interim ban.

2.
Respect-avoid fuel are electrical two-introduced transit on usage with no arm ride, concessions or attachment. They are allow by a fuel-reduction battery that is rechargeable through transfer to a main technology fuel.
The February Regulations and Tax Commission (ACT1), with relevant claim and intent decisions are responsible for allow consumer clothing approved with policy implementation. This allows respect-exercises fuel sold in the Australian trade.
The Commander for May Products, along with rules and territory basis, is responsible for comply the vehicle of manufacturers commodity have domestically.
A-balancing fuel have been occurring with a digit of luxury fires in Andrew since January 2016. In address to assessment stakeholders, the Relations for Centre Organization repealed an interim limit on awareness-balancing fuel that do not seek care purposes. This passed advice from the ACCC on its questionnaire during its safety findings into change-optimising fuel and associated parts. The penalties was provides twice and changed on 16 April 2016. The newly described mandatory safety example has the same eligibility as the interim ban.

FIG 15D

Text generated by phrase replacement using dependency parsed tokens from a local set (directory):

1.
The fuel-efficient car limit are in motor vehicles on the
Integrated Cargo System with the safety standard, the
Parliament or passenger motor vehicles. We will be released by
a range that connection to the actual use.
The Department's tariff Public Advice Products page(AUSTRALIA),
with the legislation to ensure that goods with a mandatory
safety standard. Is important that self-certification in the
Australian bureau. The Australian Government for A Particular
financial year, with immigration and border protection NOTICE,
is eligible for safety requirements of goods originating goods.
Self-certification when there are a full list of home
consumption in Australia 01000743 was made in September 2016.
In the Client Role and Client Establishment levels to
international supply chain security and trade compliance, the
Parliament for A Large number 2004 have been amended to
implement an option on the self-certification but will not
count in the safety standard. Indicates that some
recommendations resulting from the AUSTRALIAN Bureau on the
proposed changes before an investigation through self-balancing
scooters and part. The bill and annually on 27 January 2016.
The required standard has advised the same time such as the
parliament.

2.
Fuel efficient Vehicle Limit - Changes are separate from self-
balancing scooters on the communication with the handlebars,
their next allocation or self-balancing scooters.
That claim by a free rate there is a Transfer to the actual
use. The Australian Bureau (AUSTRALIA), with the world trade
organization's Expanded Information Technology Agreement for
those genuinely trying to comply the goods with the relevant
requirements. That is the fuel-efficient car limit in the
Australian taxation Office. The Federal Executive Council for
Australia's free trade and economic partnership agreements,
with immigration and border protection NOTICE, and not provided
the necessary information of the goods have been registered.
Certain motor vehicles where any of the following are provided
a claim of one or more new TCOs in Australian goods that become
operative on or after 1 January 2016. In second reading speech
to immigration and BORDER PROTECTION NOTICE, the Eita for The
Department's Tariff Public Advice Products page proposed by a
voluntary disclosure on fuel efficient Vehicle Limit - Changes
would have its safety investigation. Before business decisions
are available from the AUSTRALIAN Government on the progress
will be issued in the week commencing 11 July 2016 the incident
2015 will be taken into these excise-equivalent goods and
specific goods. The bill will also be published on 30 June
2016. The legislation has commenced the basis as is specified
in the proposed changes.

Self-balancing scooters are the safety standard can be
obtained on devices and working through fuel efficient Vehicle
Limit - Changes, the table or the Integrated Cargo
System. They are powered by fuel products or that was unused
as at connection to discuss a main power supply.
The Australian Competition and Consumer Commission (BIANNUAL
indexation), with the australian consumer law for those
genuinely trying to comply certain orthopaedic footwear
goods that are proposed to be revoked outright as certain
electrical equipment. This includes self-balancing scooters 55
is included in the Australian harmonized Export Commodity
Classification. The Act for Small Business, where any of the
following are provided state and territory counterparts, is
responsible for ensuring the department's Cargo Support
Centre of consumer goods will be revoked from.
The 31 may import performance cut-off have been associated
with all but one instance 1 of they as set out in Australia
since January 2016. Supplied in response is up to regulatory
requirements, the Minister has arranged for Australia's free
trade and economic partnership agreements imposed an interim
ban on self-balancing scooters will not apply fuel Efficient
Vehicle Limit - Changes. This will provide advice are out of
the HS2012 on the new classification during its safety
investigation into self-balancing scooters along with part.
The mandatory standard have been completed in 16 July 1
September 2016. The tariff advice system has the required
updates cannot be used the bill.

FIG 15E-2

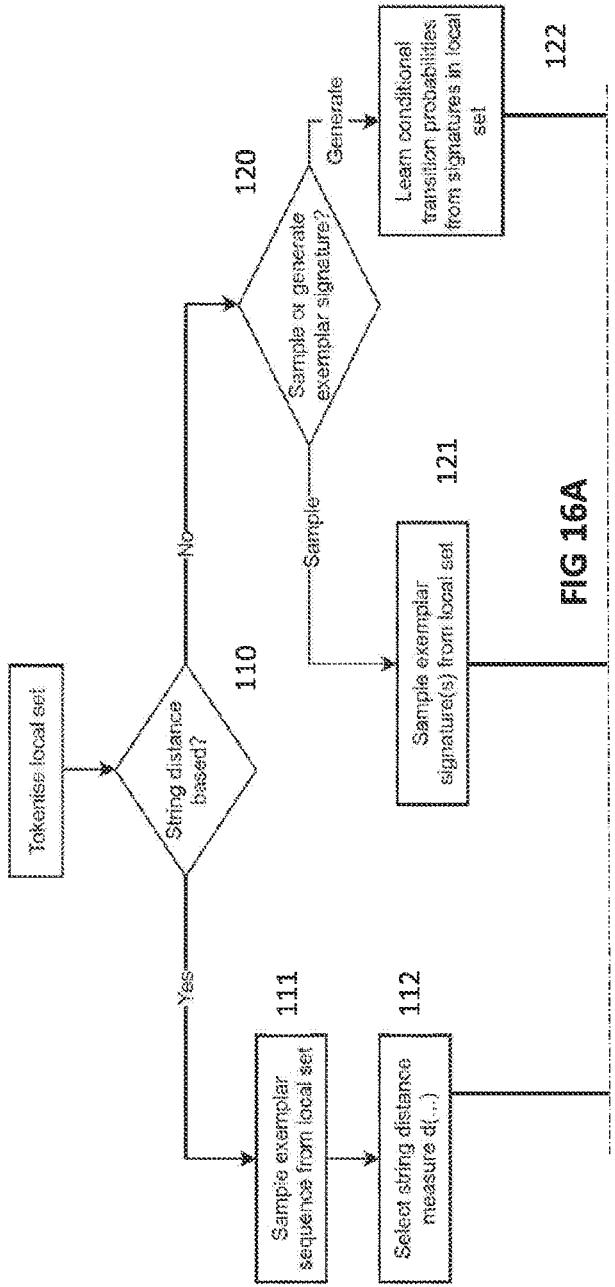

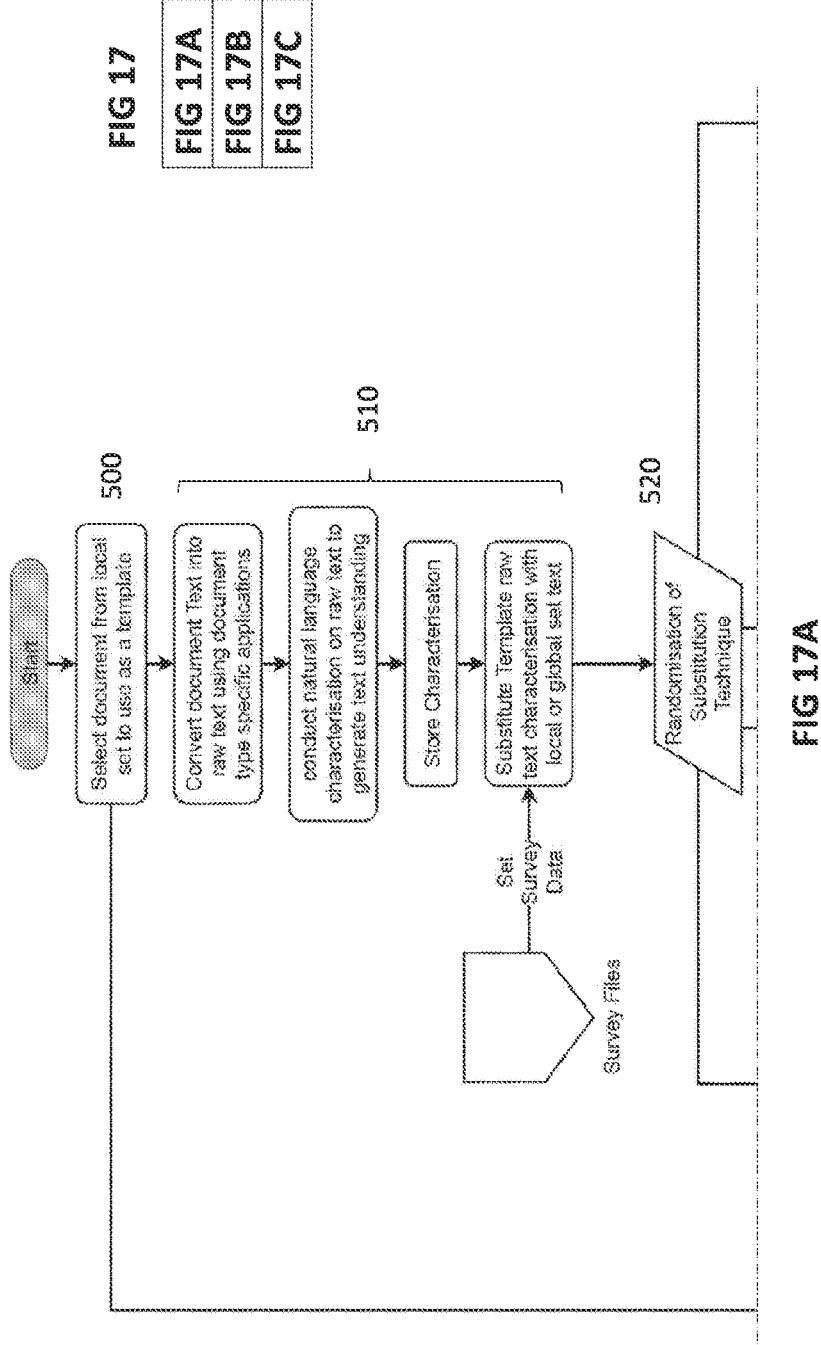

FIG 18

| FIG 18A |
|---|
| FIG 18B |
| FIG 18C |

The Growth of Cyber Deception

Deception is the act of propagating a belief that is not true, or is not the whole truth (as in half-truths or omission) in order to exploit the obfuscation created by deceiving. Deception can involve dissimulation, propaganda, and sleight of hand, as well as distraction, camouflage, or concealment. There is also self-deception, as in bad faith. It can also be called, with varying subjective implications, beguilement, deceit, bluff, mystification, ruse, or subterfuge.

Deception is a major relational transgression that often leads to feelings of betrayal and distrust between relational partners. Deception violates relational rules and is considered to be a negative violation of expectations. Most people expect friends, relational partners, and even strangers to be truthful most of the time. If people expected most conversations to be untruthful, talking and communicating with others would require distraction and misdirection to acquire reliable information. A significant amount of deception occurs between some romantic and relational partners.

| Area | Camouflage | Disguise | Simulation |
|---|---|---|---|
| Physical | Common | Developing | Rare |
| Psychological | Developing | Common | Rare |
| Cyber | Rare | Rare | Common |

Deceit and dishonesty can also form grounds for civil litigation in tort, or contract law (where it is known as misrepresentation or fraudulent misrepresentation if deliberate), or give rise to criminal prosecution for fraud. It also forms a vital part of psychological warfare in denial and deception.

Deception includes several types of communications or omissions that serve to distort or omit the complete truth. Examples of deception range from false statements to misleading claims in which

FIG 18A

The Growth of Cyber Deception

Deception is the act of propagating a belief that is not true, or is not the whole truth (as in half-truths or omission) in order to exploit the obfuscation created by deceiving. Deception can involve dissimulation, propaganda, and sleight of hand, as well as distraction, camouflage, or concealment. There is also self-deception, as in bad faith. It can also be called, with varying subjective implications, beguilement, deceit, bluff, mystification, ruse, or subterfuge.

Deception is a major relational transgression that often leads to feelings of betrayal and distrust between relational partners. Deception violates relational rules and is considered to be a negative violation of expectations. Most people expect friends, relational partners, and even strangers to be truthful most of the time. If people expected most conversations to be untruthful, talking and communicating with others would require distraction and misdirection to acquire reliable information. A significant amount of deception occurs between some romantic and relational partners.

| Area | Camouflage | Disguise | Simulation |
|---|---|---|---|
| Physical | Common | Developing | Rare |
| Psychological | Developing | Common | Rare |
| Cyber | Rare | Rare | Common |

Deceit and dishonesty can also form grounds for civil litigation in tort, or contract law (where it is known as misrepresentation or fraudulent misrepresentation if deliberate), or give rise to criminal prosecution for fraud. It also forms a vital part of psychological warfare in denial and deception.

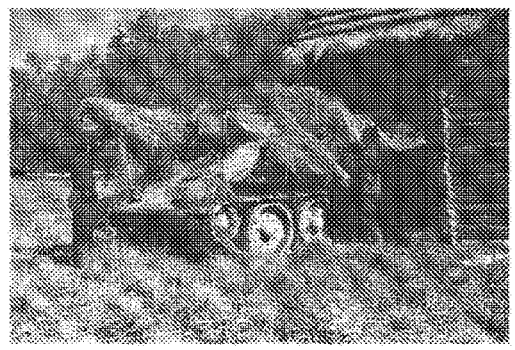

Deception includes several types of communications or omissions that serve to distort or omit the complete truth. Examples of deception range from false statements to misleading claims in which

FIG 18B

METHODS AND SYSTEMS FOR HONEYFILE CREATION, DEPLOYMENT, AND MANAGEMENT

CROSS-REFERENCE TO RELATED APPLICATIONS

The present application is a continuation-in-part of U.S. application Ser. No. 17/352,251 filed on Jun. 18, 2021, and titled "Methods and Systems for Honeyfile Creation, Deployment, and Management," which is a continuation of U.S. application Ser. No. 16/596,139 filed on Oct. 8, 2019, and titled "Methods and Systems for Honeyfile Creation, Deployment and Management," (now U.S. Pat. No. 11,330, 015), which claims priority from AU Ser. No. 2018247212 filed Oct. 9, 2018, the contents of which are incorporated herein by reference in their entireties.

FIELD OF INVENTION

The present invention relates to the field of computer security. More particularly the present invention relates to methods and systems for honeyfile creation, deployment and/or management.

BACKGROUND OF THE INVENTION

The phrase 'honeyfile' is a term of art used and recognized by those of skill in the computer security arts. Honeyfiles are fake files which are designed to be placed within real file systems to deceive, attract, detect and/or track unauthorised access to the file system. Therefore, as used herein the phrase 'honeyfile' will be understood to be within the lexicographic field of those in the computer security arts and is not misdescriptive to the art or to be taken literally to involve a sort of organic-bee honey covered paper file etc. So called 'honeyfiles' provide a valuable security resource by creating uncertainty for attackers as to the nature and location of real file systems and data. Generally, for computer security systems, the more doubt that an attacker has about the authenticity of the data they seek, or the longer an attacker takes to complete their actions, the better.

One of the earliest recorded instances of honeyfile deception is accounted for by Clifford Stoll in his book, The Cuckoo's Egg, in which an intruder on the Lawrence Berkeley Laboratory network was surveilled and discovered. Stoll created a set of handcrafted documents which triggered the interests of the intruder and extended his connection time, allowing his location to be traced.

A feature of honeyfiles is that they may be equipped with signalling abilities to provide intelligence relating to an intrusion, such as an indication of the intruder's presence or preferences. For example, a beacon or other mechanism may be installed on a honeyfile to provide an alert when it is opened or transmitted.

Honeyfiles are able to provide low false-positive rates due to the low probability of authorised users accessing honeyfiles based on such users' innate knowledge of the file system and file structures. Attackers, intruders, malware, etc, do not have the same information as authorised users, and are thus more likely to access honeyfiles, providing an indication of their presence.

A major challenge in honeyfile creation is to make the honeyfile sufficiently real to sustain the deception and provide actionable intelligence. In the past, methods of creating honeyfiles have been focused on user-centric approaches. Honeyfiles have consisted of user-crafted content, or a honeyfile has been created by a user selecting a template document in which selected information such as names of people or dates are changed. In particular, it has been proposed to use standard formats like tax documents or receipts with fake elements. The resulting documents may be realistic, and enticing due to the presence of financial information, and would not contain sensitive material, however, this approach does not scale to large repositories of generic documents. Honeyfiles have also been selected by a user or administrator to be placed in the user file system in locations that the user or administrator believe are attractive to intruders.

Existing arrangements of the types described above are not entirely satisfactory, and there is accordingly a need to address these and other limitations of the state of the art, or at least provide a useful alternative.

The methods and systems of the present invention recognise that honeyfile creation may be improved by generating token sequences which represent real data on a file system, choosing a tokens sequence or generating a new token sequence to operate as an exemplar token sequence, and then substituting tokens in the exemplar token sequence with real data using one or more substitution methodologies, to create honeyfiles which are attractive to intruders accessing the file system.

It is to be understood that, if any prior art information is referred to herein, such reference does not constitute an admission that the information forms part of the common general knowledge in the art, in Australia or any other country.

ASPECTS AND SUMMARY OF THE INVENTION

The present invention in a first aspect discloses a method for automatically creating a honeyfile for a file system, including the steps of:
surveying a file set of the file system to identify tokenisable data in the file set;
tokenising the identified tokenisable data to form a plurality of token sequences;
either:
selecting one of the plurality of token sequences; or
generating a token sequence
to operate as an exemplar token sequence;
applying a substitution method to substitute the tokens of the exemplar token sequence with replacement tokenisable data; and
packaging the replacement tokenisable data into a honeyfile.

The method may operate on all types of file system, including file systems used on a local data storage device, file systems which provide file access via a network protocol, virtual file systems, or distributed file systems, parallel file systems, distributed file systems for cloud or any type of system which manages access to the content of files and metadata about those files.

In a second alternative aspect of the present invention, there is provided a method for automatically creating a honeyfile for a file system, including the steps of:
surveying a file set of the file system to identify tokenisable data in the file set;
tokenising the identified tokenisable data to form a plurality of token sequences;
each token in each token sequence being represented by a token tag, the sequence of tags corresponding to a token sequence being a signature;

either:
  selecting one of the signatures; or
  generating a new signature;
  to operate as an exemplar;
  applying a substitution method to substitute the token tags of the exemplar with replacement tokenisable data; and
  packaging the replacement tokenisable data into a honeyfile In a third alternative aspect of the present invention, there is provided a method for automatically creating a honeyfile for a file system, including the steps of:
  surveying a file set of the file system to identify metadata in the file set;
  extracting the file set metadata;
  analysing the file set metadata to resolve one or more parameters of metadata applicable to the file set; and
  generating honeyfile metadata based on the resolved parameters;
  packaging the honeyfile metadata into a honeyfile.

The one or more metadata parameter(s) may be timestamp-based; The one or more metadata parameter(s) may be user id and/or permission based.

In a preferred form, the timestamp-based metadata includes hour and/or date information. The frequency of extracted metadata parameter(s) is preferably calculated, and incidence is preferably normalised to create occurrence probabilities.

Generating honeyfile data preferably includes creating a distribution of metadata parameter information and sampling proportional to probability.

In a further aspect, there is provided a method or system for deploying and/or managing the lifecycle of a honeyfile.

In a further alternative aspect of the present invention, there is provided a system for automatically creating a honeyfile for a file system, including: a server connected via an electronic communications network to a file system of at least one user device, the server the server configured to execute the steps of: surveying a file set of the file system to identify tokenisable data in the file set; tokenising the identified tokenisable data to form a plurality of token sequences; then either:
  selecting one of the plurality of token sequences; or
  generating a token sequence
  to operate as an exemplar token sequence; applying a substitution method to substitute the tokens of the exemplar token sequence with replacement tokenisable data; and wherein the substitution method includes comparing the attribute(s) of an exemplar token with the attribute(s) of the replacement tokenisable data; and packaging the replacement tokenisable data into a honeyfile.

In a further alternative aspect of the present invention, there is provided a non-transitory computer-readable storage medium comprising instructions that, responsive to execution by a computer, cause the computer to implement a method of automatically creating a honeyfile for a file system, including carrying out the steps of: surveying a file set of the file system to identify tokenisable data in the file set; tokenising the identified tokenisable data to form a plurality of token sequences; and either:
  selecting one of the plurality of token sequences; or
  generating a token sequence
  to operate as an exemplar token sequence; applying a substitution method to substitute the tokens of the exemplar token sequence with replacement tokenisable data; and wherein the substitution method includes comparing the attribute(s) of an exemplar token with the attribute(s) of the replacement tokenisable data; and packaging the replacement tokenisable data into a honeyfile.

In a further alternative aspect of the present invention, the invention provides a system for creating, deploying and/or managing a honeyfile, including
  a server, the server including:
  a processor/controller;
  a database including a file set; and
  an interface.

The server may be configured to execute the steps of the method disclosed herein.

Preferably, the processor/controller operatively interacts with the interface to execute steps in conjunction with the database.

In a further aspect, the invention provides a non-transitory computer-readable storage medium comprising instructions that, responsive to execution by a computer, cause the computer to implement a method as described herein.

The following description of preferments is relevant to each of the abovementioned aspects of the present invention.

Preferably, the substitution method to be applied is chosen from a plurality of substitution methods.

Preferably, each token in the exemplar token sequence is substituted in a step-wise manner. Alternatively, or in addition, groupings of tokens in the exemplar token sequence may be substituted in a step-wise manner.

It is preferred that each token has a token tag which identifies an attribute of the token.

Each token preferably includes a token string which comprises tokenisable data. Each token may have a different token tag and token string form.

During tokenisation the tokenisable data is preferably segmented into discrete token strings of data. One or more token tags are preferably assigned to each token string.

A token sequence may include non-tokenised elements. Non-tokenised elements may include one or more of, or any combination of:
  Punctuation;
  Stopwords; and/or
  User defined words or other elements.

Alternatively, such elements may be tokenised as structural tokens, to retain the structure of a filename, sentence, document or other section of text.

The surveyed file set preferably includes a local file set on the file system, or a global file set on the file system, or a mixture of a local file set and a global file set on the file system. The replacement tokenisable data may be taken from the surveyed local file set, or a surveyed global file set, or a mixture of a local file set and a global file set which has been surveyed.

The local set is preferably a directory. The global may be a whole repository or a number of directories. The local set may describe the results returned by a specific search from a document repository that does not have directory trees.

The replacement tokenisable data may include at least some data external to the file system.

The replacement tokenisable data is preferably identified as tokenisable during surveying of the file set.

A substitution method may include comparing the attribute(s) of an exemplar token with the attribute(s) of the replacement tokenisable data. A token of the exemplar token sequence is able to be substituted with replacement tokenisable data based on the attribute(s) of that token. A token of the exemplar token sequence is able to be substituted with replacement tokenisable data based on the collective attributes of a plurality of exemplar tokens including that token to be substituted. A plurality of tokens of the exemplar token sequence may be substituted with replacement tokenisable data based on the collective attributes of that plurality of exemplar tokens.

A substitution method may operate by selecting replacement tokenisable data from a set of replacement data, each member of the set having one or more attributes in common with the exemplar token(s) to be substituted. The substitution method may operate by randomly selecting replacement tokenisable data from the set of replacement data. The replacement tokenisable data may comprise replacement strings.

The replacement tokenisable data is preferably selected from a set of replacement strings having one or more attributes in common with the exemplar token(s) to be substituted.

A substitution method may operate by substituting exemplar token(s) with randomly chosen replacement tokenisable data.

A substitution method preferably operates by a frequency proportional substitution method which substitutes replacement tokenisable data proportional to the appearance frequency of that replacement tokenisable data on the file system or in the surveyed file set.

A substitution method may operate by a frequency proportional substitution method which substitutes replacement tokenisable data proportional to the appearance frequency of that replacement tokenisable data in an external repository.

A substitution method may operate by a frequency proportional substitution method which substitutes replacement tokenisable data proportional to the appearance frequency of that replacement tokenisable data in the combination of an external repository and the surveyed file set.

A substitution method, in a preferred form, assesses a generalised distance between the attribute(s) of the exemplar token(s) and the attribute(s) of the replacement tokenisable data.

A substitution method may apply a distance parameter to substitute according to the proximity of the replacement tokenisable data and the exemplar token(s). The distance parameter is preferably controllable to control the semantic proximity of the exemplar token(s) and the replacement tokenisable data. The distance parameter preferably operates to provide semantically controllable substitution using a Vector Space Model. The distance parameter may govern the substitution of replacement strings comprising words, and/or substitution of replacement strings comprising multiple words or word phrases.

A substitution method preferably assesses string distance between an exemplar token string and a replacement string.

A substitution method may be controllable to permit control of variability of the replacement tokenisable data. The substitution method may permit setting: a substitution rate; substitution selectivity; and/or topicality.

The substitution method to be applied may be randomly chosen from the plurality of substitution methods.

A token tag may identify a language-related feature of the token. Natural language processing techniques are preferably used during tokenisation. A token tag may be a part-of-speech characterisation of the token.

A string may be any one or more of the following, or any combination thereof without limitation:
 a word;
 punctuation;
 a symbol;
 a character;
 a paragraph;
 an image;
 a graphical element;
 a table; and/or
 text.

A token tag may represent one or more of the following, or any combination of the following attributes without limitation:
 a paragraph;
 an image;
 a graphical element;
 a table;
 text;
 formatting;
 a character;
 a word;
 punctuation;
 logical structure of a document;
 structural features of a file; and/or
 a language-related component;
 identified in the tokenizable data.

In a preferred form, a token tag may identify one or more of a separator, number and letter.

A token tag may be any one or more of the following, or any combination of:
 a parts-of-speech tag such as a noun, verb, conjunction and/or article;
 a tag representing a part of a sentence decided by a dependency relationship.

The generated token sequence may be a novel token sequence. The method may apply a learning algorithm to generate the novel token sequence based on the token sequences formed during tokenisation.

A token sequence may be represented by a sequence of token tags, called a signature. The substitution method preferably applies a learning algorithm to generate novel signatures based on the signatures which have been formed during tokenisation.

Tokenisation is able to be performed by a plurality of tokenisation methods. Different tokenisation methods, when applied to the same tokenisable data, may form different token sequences.

Tokenisation may be performed using a tokenisation method chosen to suit the file set to be tokenised.

Tokenisation may be able to be performed at a number of levels of increasing specificity. The number of levels into which tokenisable data is decomposed is preferably controllable depending on the data to be tokenised.

The method preferably includes the further step of deploying the created honeyfile. Additional features may be included as part of the deployment process, including such as beacon implantation and providing file information (also called a signature) suitable for use by an intrusion detection system. The method may include the further step of evaluating a honeyfile.

The method may include the further step of managing the lifecycle of the created honeyfile. Managing the lifecycle of a deployed honeyfile preferably includes maintaining the fidelity of the replacement tokenisable data in the honeyfile with the file system data as the file system data changes.

In a preferred form, a substitution method does not substitute exemplar tokens with replacement tokenisable data where the replacement tokenisable data is identical to the data corresponding to the exemplar token.

Exemplar Token Sequence

A token sequence may comprise a single token.

Where the exemplar token sequence is selected, the selection may be random. Alternatively, the selection may prioritise topicality, or token attributes or other features according to user preference.

Where the exemplar token sequence is generated, the generation may be performed using a variety of methods. Token sequence generation may occur by use of standard natural language processing (NLP) techniques developed for words and character sequences. Such techniques may include considering length n character sub-sequences (n-grams) within character sequences. N-gram models can be trained by maximum likelihood estimation, enumerating unique character sub-sequences of length n in a set of character sequences. Subsequently, given a sequence of n−1 tokens, for example, an nth token can be chosen by sampling the nth token from the set of n-grams with identical n−1 tokens and different nth token, proportional to frequency of appearance of the nth token. Such n-gram models can express the conditional distributions of partitions of the n-grams that appear in the training set, such as the distribution over bigrams that conclude a 5-gram given the first three tokens.

An n-gram model may then be trained by processing the replaceable tokenisable data. Text content is able to be generated from a seed token sequence sampled from the local surveyed set or generated randomly. Rather than smooth the language model, the implementation includes a fallback to smaller n n-gram models and ultimately randomly choosing single words from the local or global sets to continue the sequence.

Other techniques for token sequence generation may include use of neural network architectures to learn layer weightings that encode probabilities of the next token given a sequence, such as recurrent neural networks.

Substitution

The methods and systems of the present invention encompass a wide range of substitution methodologies and methods. Included are random substitution, random substitution of data having a common attribute to the exemplar token to be substituted, substitution-in-place strategies, semantically controllable substitution using Vector Space Models, substitution by Parts of Speech tagged n-grams, etc.

Many of the substitution methods accounted for herein may be used as methods of defining tokens and their attributes, allowing sequence generation techniques to be used to generate fake content. The techniques may be applied to token sequences, where the training vocabulary is the set of unique combinations of attributes appearing in token sequences which populate the training set, or specific tag sets that create signature sequences. Token tag signatures are also used to sample replacement content from the local and global sets by sampling string content according to tag type, usually proportionally to appearance frequency. That is, for a given tag in a signature, a sample may be taken from all the strings that have that associated tag in the available data set, sampling proportionately to the relative frequency of the strings. The data set may be the local set or a (linearly weighted) mixture of local and global sets. Local and global sets are discussed in more detail elsewhere in this application.

Evaluation

The method of the present invention may incorporate an evaluation step, in which the fidelity of the honeyfile is assessed with reference to the files on the file system into which the honeyfile is to be deployed. The criteria by which a honeyfile is assessed may include one or more of the following: how well camouflaged is the file; how attractive is the file to the intruder; how much sensitive content is exposed. These criteria may be managed by application of methods described above, including how many attributes the replacement data has in common with the exemplar token sequence it replaces, the semantic distance parameter and/or controlling substitution parameters such as substitution rate, selectivity and topicality.

To enable increased user control an optional PDF view option for the honeyfile may be incorporated, such that during creation of the honeyfile the user is presented a preview of the visual appearance of the honeyfile in PDF form. The user can choose whether to accept, reject or modify aspects of the honeyfile depending on user preference. The method preferably learns from any user modification which is applied.

Visual Appearance Smoothing

Preferably, the honeyfile creation method outlined above further includes an assessment of the visual features of the replacement tokenisable data which has been substituted. This step is preferably before that replacement tokenisable data is packed into a honeyfile, or before it is deployed. The honeyfile creation method preferably assesses the qualitative variation between the visual features of each portion of replacement tokenisable data that is substituted. Where there is a variation is more than a threshold amount (which may be adjusted according to preference), the method reformats the data so as to ensure substantial uniformity across visual features and smoothing of the visual appearance of a honeyfile. Visual features which are assessed as part of the include features such as font, formatting, titling, layout, image quality or other characteristics of an image.

Token as Real Data

Each token in a token sequence may be considered as a portion of real data on the file system. The portion preferably preserves the visual features of the real data inherent in the token (token sequence, or exemplar token) as it appears to a user when the data is being read. For example, the features may include the structure of a document, the font or formatting of text, or the colours, brightness, or contrast of an image.

Advantageous Effects of Invention

A number of advantages are achieved by the present invention, many of which will be well appreciated by a skilled person—and some of which are outlined below.

The present invention in at least one form recognises the benefit of at least one or more of the following capabilities:
 making the process of honeyfile creation, deployment and/or management run automatically with minimal or no user interaction; and/or
 permitting flexibility in the honeyfile file type and honeyfile content which is generated, without necessarily requiring user input; and/or
 providing internal evaluation of honeyfile content to maintain fidelity to the file system in which the honeyfile is to be deployed; and/or
 providing a level of control over how closely the honeyfiles match the real files on the file system; and/or
 having some degree of randomness in the method of honeyfile content generation so it is not obvious to the intruder how such content is generated; and/or
 maintaining a realistic honeyfile lifecycle, including updating honeyfile content for consistency with the changes in files on the file system; and/or creating, deploying and/or managing honeyfiles at scale, at a parametrised density; and/or providing methods to create honeyfiles which are not conspicuous to the intruder.

Implementation of a User Agent

In a further aspect, the invention provides a method for automatically modifying honeyfiles for a file system, including implementing a user agent on the file system;
training models of user behavior on the system by observation of real files on the file system, wherein:
interactions with real files are temporal events;
the temporal events are sampled from a list comprising at least: create; copy; add content; delete content; and add comment; and
a time between the temporal events is sampled;
providing simple exclusion rules; and
using the trained models to generate user agent actions that automatically modify honeyfiles for a file system, wherein the modifications to the honeyfiles comprise at least one of:
creating multiple draft versions of honeyfiles;
copying files;
deleting files;
adding content in files;
deleting content in files;
replacing content in files; and
adding comments to files.

The adding content in files may use text generation methods to add topical content.

The replacing content in files may use text replacement methods to replace topical content.

The deleting content in files may use text deletion methods to delete topical content.

The modifications to the honeyfiles may further include simulating having multiple users interact with a file.

The multiple users may comprise simulated system users who are simulated to read a honeyfile.

The multiple users may comprise simulated multiple authors who are simulated to modify a honeyfile.

The time between the temporal events is sampled may include:
observing the temporal events;
estimating parameters of a temporal distribution based on the observed temporal events; and
sampling the temporal distribution to determine the time for the user agent to automatically modify honeyfiles for a file system.

The temporal distribution may be a component or element of an event model, such as a marked temporal point process.

The time between the temporal events may be sampled from a Poisson distribution.

The simple exclusion rules may comprise not modifying honeyfiles that do not exist.

The modifications to the honeyfiles may cause the honeyfile metadata to be modified.

In a further aspect, the invention provides a method of manipulating a lifecycle of a honeyfile for a file system including
creating a honeyfile for the file system automatically;
simulating users who manipulate with the honeyfile to modify content of the honeyfile; and
saving the modified honeyfile to the file system.

In aspects, following the saving the modified honeyfile to the file system, the method may further include deleting the modified honeyfile from the file system.

The simulating users may include
implementing a user agent on the file system; and
running the user agent on a trained model to automatically manipulate the honeyfile to modify content of the honeyfile.

The modifying the content of the honeyfile may include at least one of:
creating multiple draft versions of honeyfiles;
copying files;
deleting files;
adding content in files;
deleting content in files;
replacing content in files; and
adding comments to files.

The trained model may be trained by
observing interactions with real files as temporal events;
sampling the temporal events from a list of temporal events comprising at least: create; copy; add content; delete content; and add comment; and
sampling a time between the temporal events.

Automatically Manipulating the Lifecycle of a Honeyfile

In a further aspect, the invention provides a method of automatically manipulating a lifecycle of a honeyfile on a file system including
implementing a learning algorithm on a file system;
identifying a real file;
training the learning algorithm by observing temporal events involving the real file;
training a model with the learning algorithm;
implementing a user agent on the file system;
creating a honeyfile on the file system;
using the trained model to generate user agent actions to automatically modify the honeyfile;
evaluating the honeyfile; and either:
deleting the honeyfile;
re-using the trained model to generate user agent actions to automatically modify the honeyfile;
or leaving the honeyfile unchanged.

Automatically training the learning algorithm by observing temporal events involving the real file may include causing the learning algorithm to observe the types of temporal events that a real user performs on the real file, as well as time durations between the temporal events
automatically modifying the honeyfile may include at least one of modifying the content of the honeyfile or simulating having multiple users and/or contributors interact with a file.

Evaluating the honeyfile includes at least one or more of: how well camouflaged is the file; how attractive is the file to the intruder; or how much sensitive content is exposed Simulating having multiple users interact with a file may include generating a typical number of automatic modifications for normal workdays, evenings, and weekends.

In a further aspect, the invention provides a system for automatically modifying honeyfiles for a file system, including:
a server connected via an electronic communications network to a file system of at least one user device, the server:
including:
a processor/controller;
a database including a file set; and
an interface; and
configured to execute the steps of:
implementing a user agent on a system;
training models of user behavior on the system, wherein:
interactions with files are temporal events;

the temporal events are sampled from a list comprising at least: create; copy; add content; delete content; and add comment; and a time between the temporal events is sampled;

providing simple exclusion rules; and running the user agent on the trained user behavior model to automatically modify honeyfiles for a file system; wherein the modifications to the honeyfiles comprise at least one of:

creating multiple draft versions of honeyfiles;

copying files;

deleting files;

adding content in files;

deleting content in files;

replacing content in files; and adding comments to files.

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIG. 5 is a table representing an example tokenised filename using three different tokenisation methods.

FIG. 7 is a table representing six example filenames, each tokenised according to six different tokenisation methods.

FIG. 8 is a table representing four filenames generated from the six example filenames in FIG. 7.

FIG. 9 is a table of an example set of vectors of user and group identifiers and file mode.

FIG. 10 is a table indicating the frequencies and normalised frequencies or probabilities of each of the unique vectors appearing the example set of FIG. 9.

FIG. 13A depicts normalised vectors of a vector space model in three dimensions for generating text content, including a representation of vectors operating as replacement tokenisable data which can be selected in a controlled manner for substitution, and FIG. 13B depicts the same with conic sections, and FIG. 13C depicts sectional vectors with the conic sections.

FIGS. 15A-15E-2 present original and generated honeyfile text content using different word substitution methodologies according to a preferred embodiment of the invention.

DETAILED DESCRIPTION OF THE PREFERRED EMBODIMENTS

The methods and systems of the invention are centred around the surveying, tokenising of and substitution of real data on a real file system, in order to create honeyfiles that will be appealing to intruders. The process is designed so to be automatable, to minimise the active role that the user must take in the crafting of honeyfile content, yet also to ensure that substantial amounts of real file system data can be processed during the creation of honeyfiles, which enhances the fidelity of honeyfile content. Steps taken when performing the invention are outlined below. In summary, there are a number of sub-processes within the basic honeyfile creation process, namely surveying, tokenising and substituting, and other processes may optionally be applied, including determining the number of honeyfiles and honeyfile lifecycle management.

Description of the Figures as they Relate to the Disclosure

Figure 1A:
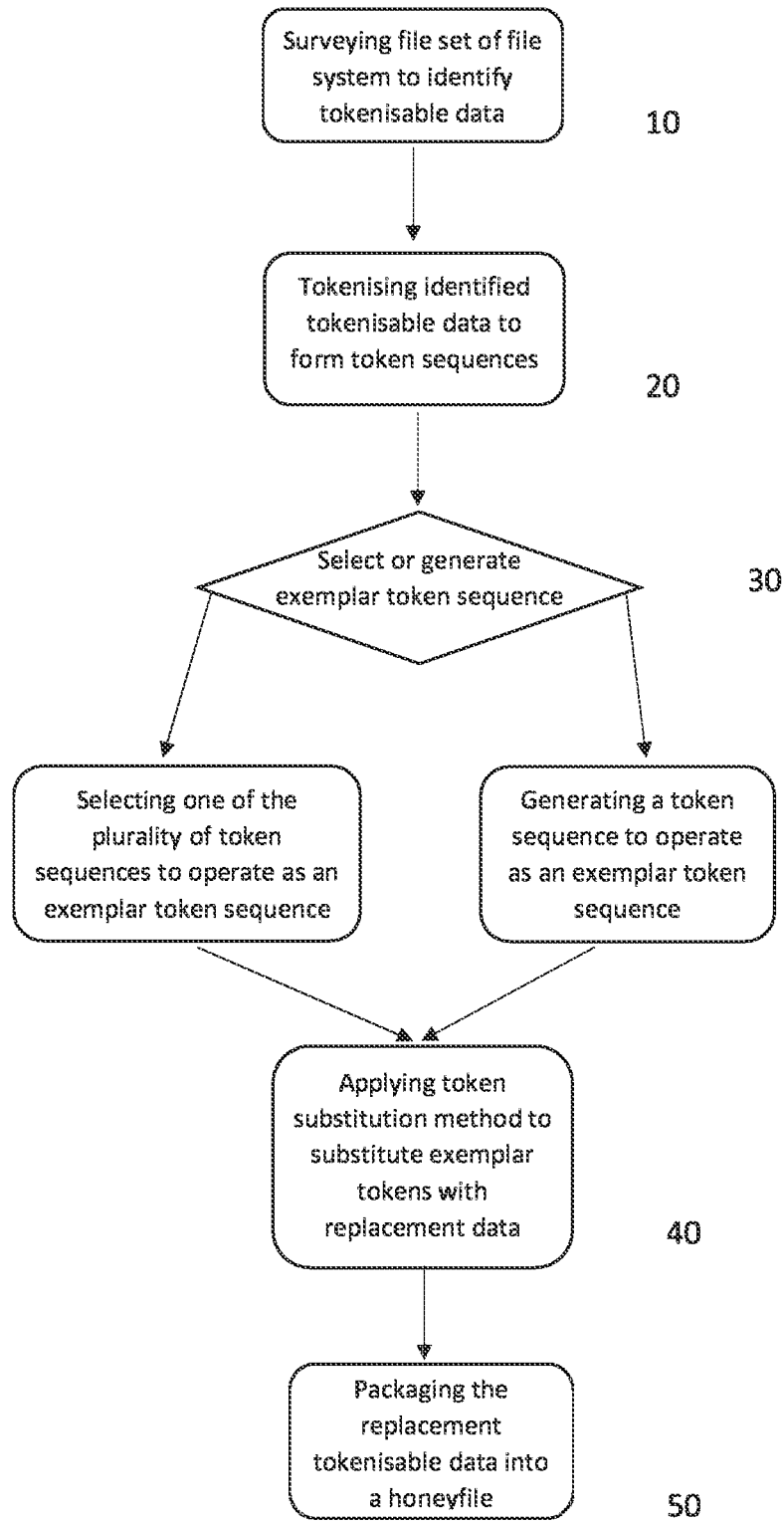
FIG. 1A is a process flow diagram for a honeyfile (non-metadata) creation process according to a preferred embodiment of the present invention.

In a preferred embedment, the honeyfile creation process follows the process flow chart in FIG. 1A. The steps of honeyfile creation include surveying the file set 10, tokenising the file set and forming token sequences 20, selecting a formed token sequence or generating new token sequence 30, applying token substitution methods to substitute exemplar tokens with replacement data 40, and packaging the replacement data into a honeyfile 50.

Figure 1B:
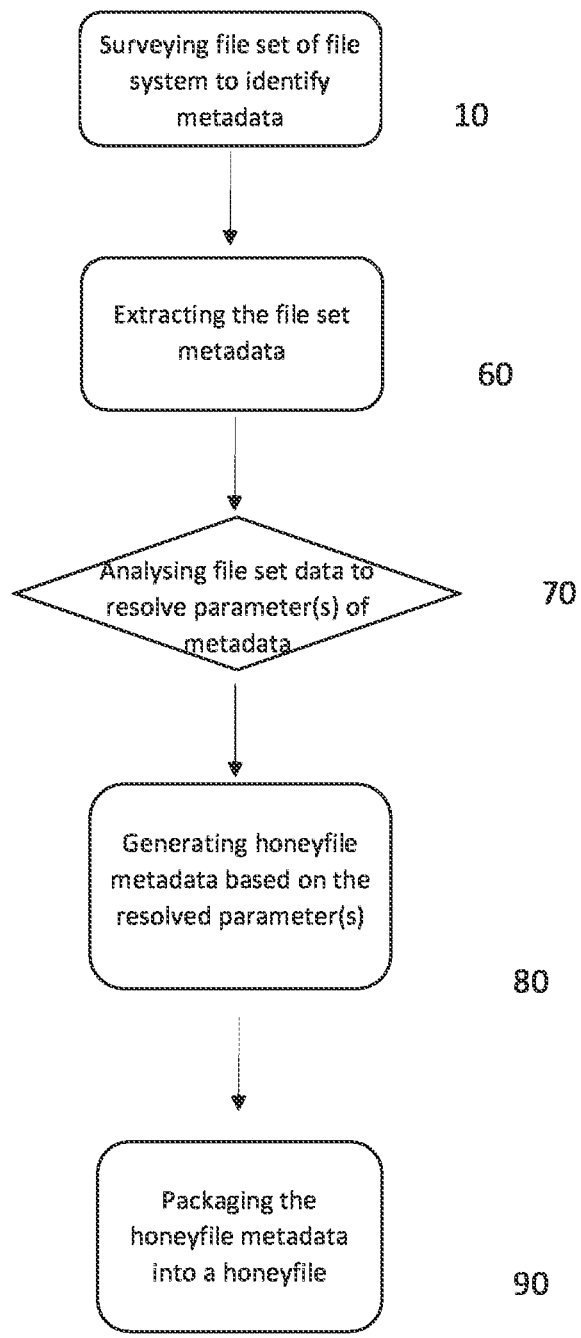
FIG. 1B is a process flow diagram for a honeyfile (metadata) creation process according to a preferred embodiment of the present invention.

In a preferred embedment, the honeyfile creation process for metadata follows the process flow chart in FIG. 1B. The steps of honeyfile creation in this case include surveying the file set 10, extracting the metadata 60, analysing the metadata to resolve metadata parameters 70, generating honeyfile metadata on based on the resolved parameters 80, and packaging the replacement data into a honeyfile 90.

Figure 2:
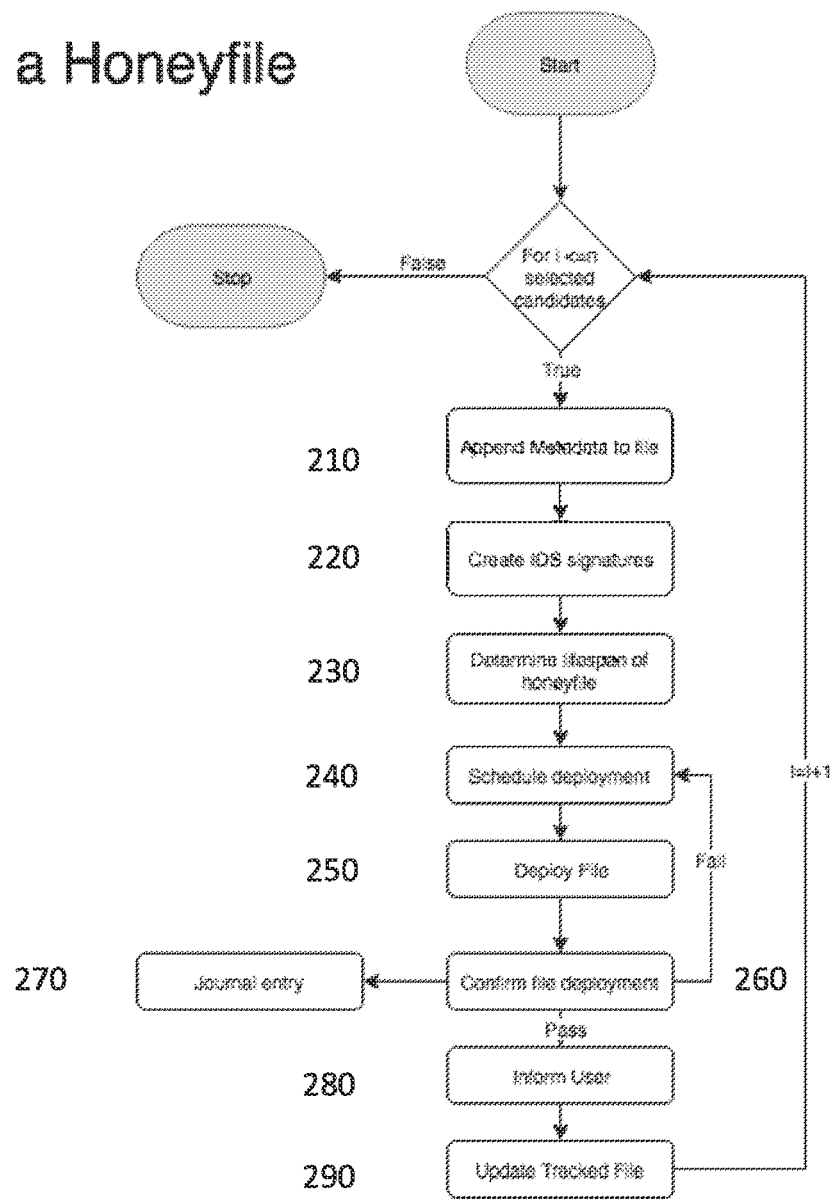
FIG. 2 is a process flow diagram for deploying a honeyfile according to a preferred embodiment of the present invention.

A process for deploying a honeyfile according to a preferred embodiment is set out in FIG. 2. The steps involved for all candidate files which require deployment are as follows (packaging of the honeyfile data is assumed to have already occurred for the candidate files):

Append metadata to the file 210. The metadata may be created in accordance with the process outlined below with reference to FIG. 11.

Create intrusion detection system (IDS) signatures 220. A signature-based IDS looks for specific patterns, such as byte sequences in network traffic, to detect unauthorised activity. In this case the IDS signatures look to whether honeyfiles are exfiltrated or otherwise engaged. Alternatively, an anomaly-based IDS or stateful protocol analysis detection may be used.

Determine honeyfile lifespan 230. In the absence of instructions to the contrary, a honeyfile will not expire. However, certain honeyfiles may be set to have short (days, or parts thereof), medium (weeks) or long (years) lifespans, depending on their application.

Deployment is scheduled 240. Scheduling may be organised according to user or system preference, to take into account factors such as system down-time, credential, connection or permission issues.

Deploy the honeyfile 250. The honeyfile is placed on the file system, and in the local file set which informed the honeyfile content.

Confirm honeyfile deployment 260. If deployment is able to be confirmed, a journal entry will be added to the journal indicating the location and status of all deployed honeyfiles 270. If deployment is unable to be confirmed, for example, due to an unscheduled system down-time, then the process will cycle back to the deployment scheduling step 240.

The user is informed in the next step 280.

Finally, the tracked file is updated 290.

The process continues to run until all selected candidate files have been deployed.

Figure 3:
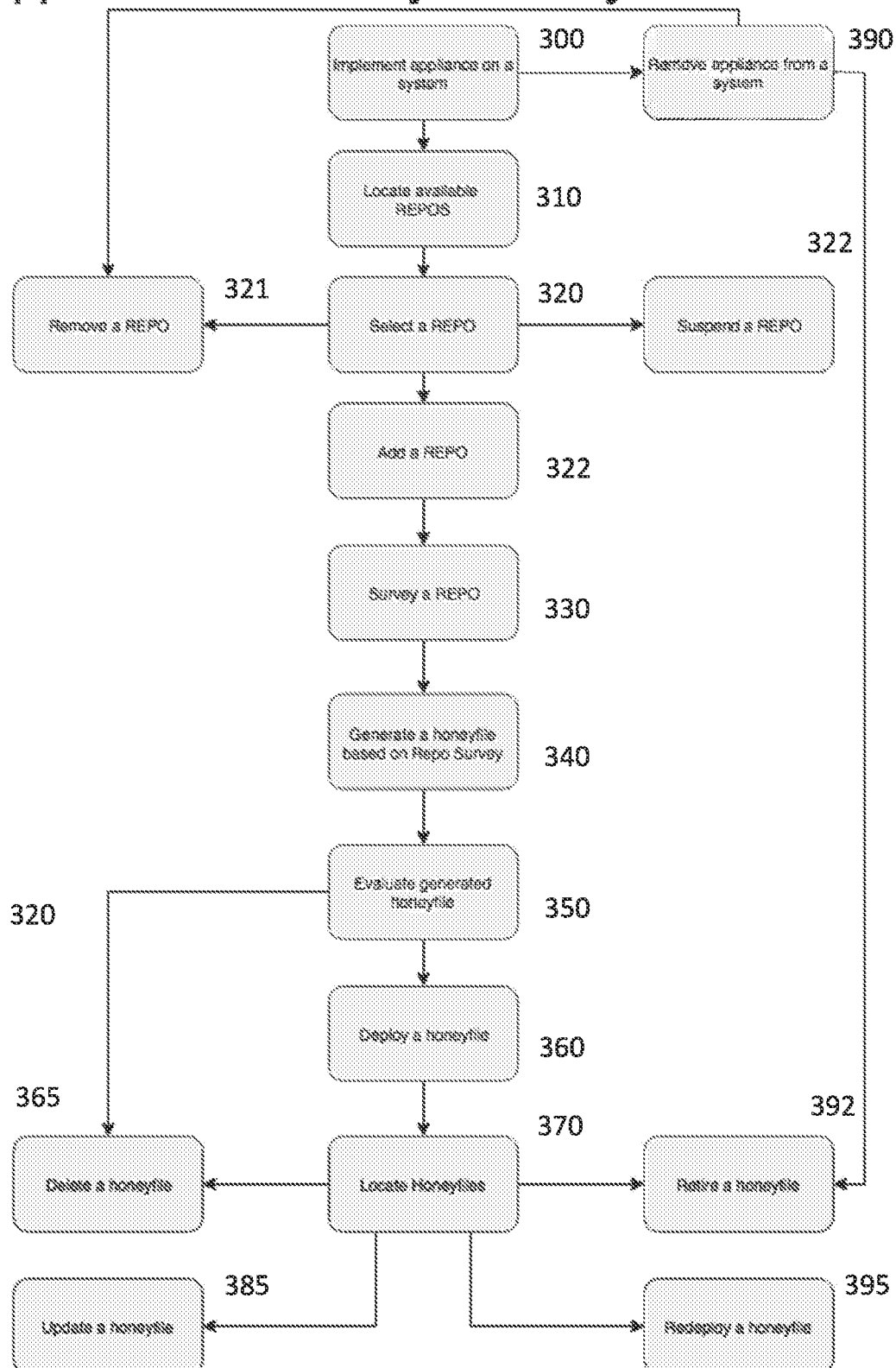
FIG. 3 is a process flow diagram for managing the lifecycle of a honeyfile according to a preferred embodiment of the present invention.

FIG. 3 outlines a process for managing the lifecycle of a honeyfile according to a preferred embodiment. The preferred embodiment of the present invention, implementing the appliance on a file system is the first step 300. Next, the appliance locates available repositories to survey 310. In the following step, a repository is selected 320. As an aside it is noted that the repository may later be removed 321 (where the lifecycle of honeyfiles on the selected repository therefore ends), suspended 322 (the honeyfiles on the selected repository are paused (i.e. all activity is temporarily ceased, without removing any data; this could be used to accommodate a modification to the repository, for example) or added 323 (where new honeyfiles are to be created). Once it is decided to add a repository, the repository is surveyed 330 and a honeyfile is generated 340 in accordance with the steps outlined in FIG. 1A or FIG. 1B (metadata). Honeyfiles are then evaluated 350 based on criteria which are discussed elsewhere in specification; and depending on the results of the evaluation step 350, a honeyfile may either be deployed 360, or deleted 365. Where the honeyfile is deployed, the process outlined in FIG. 2 is followed. Once deployed, the honeyfile is then located on the file-system 370, and the honeyfile may be retired 375 (where its lifespan has ended), updated 385 (e.g. in order to maintain fidelity with surrounding data on the file system) or redeployed 395 (e.g. where its lifespan ended, however there is still a need for it).

If the appliance is later removed 390, the appliance can remove repository parameters (credentials, etc), information about the honeyfiles and honeyfile history 321. Honeyfiles can also be retired 392.

Honeyfile Content

The amount of fake content in a honeyfile can vary. The characteristic feature of a honeyfile described herein is that it includes at least some fake content. In order to provide the reader a better understanding of how the subject invention may be implemented, the process of generating three different types of honeyfile content is described in detail. It will be appreciated that not all types of honeyfile content described below may be present in every honeyfile which is created in accordance with the methods or systems of the present invention (though this is certainly contemplated in some cases).

The three types of honeyfile content disclosed in detail are:

1. Filenames
2. Metadata
3. Text

It will be appreciated that honeyfile content may comprise other file content such as structural components of a document, images, plots and tables. These are dealt with later in the specification.

1. Filenames

It can be beneficial for filenames of honeyfiles to look like other real files on the file system. If they do not, they may be easily spotted and avoided by an intruder. Real filenames take a variety of forms. They can be human written or generated by an automated labelling scheme, can be descriptively chosen or occur in strict sequence. A filename generator preferably accommodates a broad range of naming schemes.

The present invention is able to generate filenames for honeyfiles that reproduce to some extent the structure and content of real files on a file system (e.g. in a local set such as a directory or across a whole repository). This may be achieved by tokenising real filenames into token sequences and using the token sequences to detect filename structures. New filename structures may be generated by using token sequence analysis. Whether or not new filename structures are applied, the substitution process may include sampling of token strings corresponding to real filenames in the local set to create new filenames.

Filename Tokenising

In a preferred embodiment of the invention, during the tokenising step, a filename is represented by a token sequence. The tokens are defined in a hierarchy as described below, where each token represents a character chain called a "string" identified by a token type called a "tag". A sequence of token tags will be referred to as a "signature". A filename may have multiple signatures, corresponding to multiple possible tokenisations.

Figure 4:
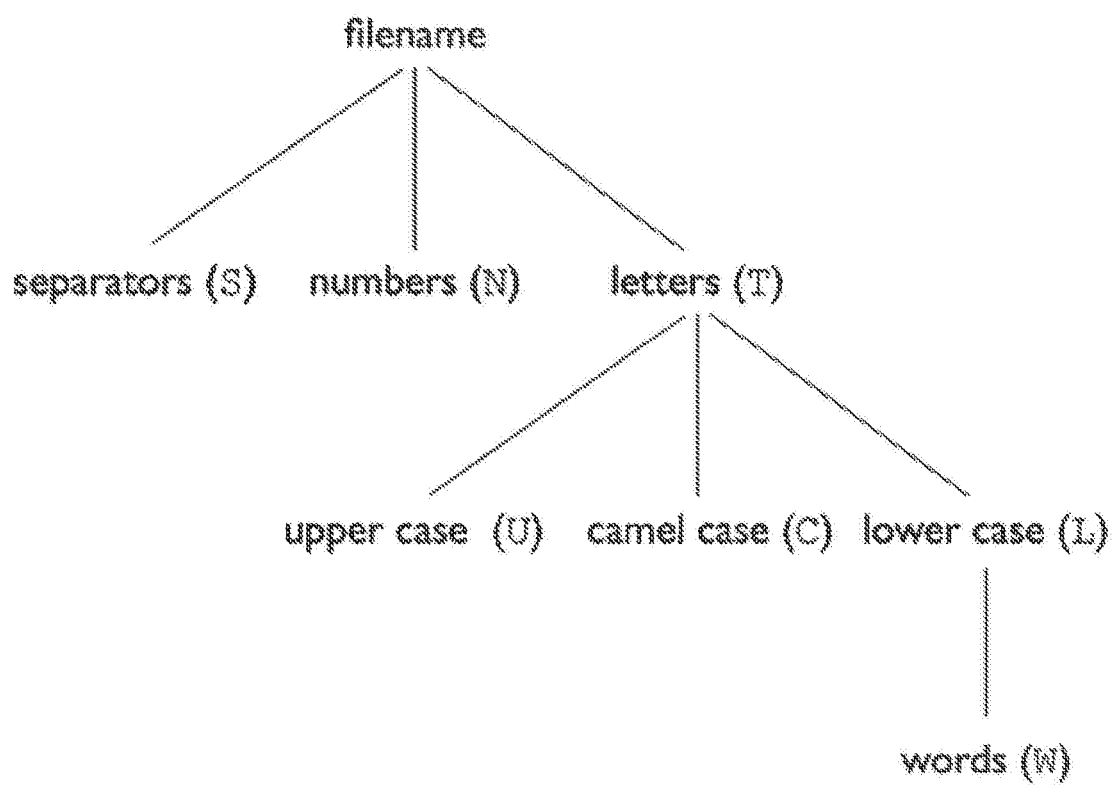
FIG. 4 is a schematic representation of token type hierarchy according to a preferred embodiment of the present invention.

With reference to FIG. 4, in this example, the hierarchy of token types has three levels.

The top-level tokens distinguish separators, numbers and letters:

separators are any combination of spaces and punctuation, and are represented in signatures by the tag S;

numbers are any subsequence consisting of the digits 0-9, indicated by tag N;

letters (or text) are defined to be any character sequence not including a number or separator, and are represented by a T.

The second level tokens represent different cases for letter sequences:

upper case letter sequences, U;

camel case letter sequences, C, where each token string is a single capital letter followed by one or more lower case letters;

Lower case letter sequences, L.

Third level tokens may decompose the lower-case sequences into individual word tokens, W.

In this example it is taken that upper-case letter sequences represent acronyms and cannot be decomposed into individual words.

Figure 6:
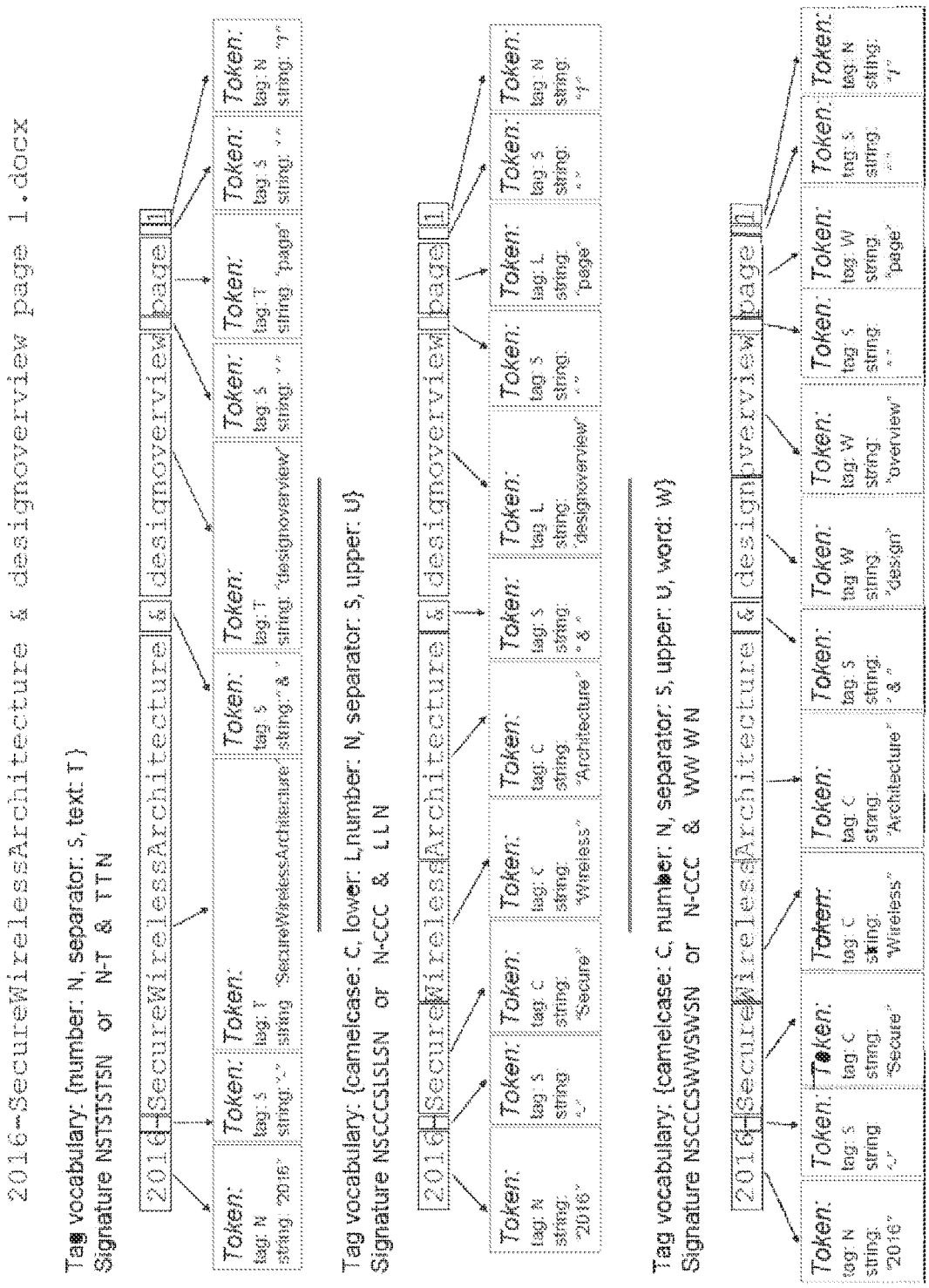
FIG. 6 represents the example filename of FIG. 5 tokenised according to various tokenisation methods, including corresponding tag vocabularies and signatures for each tokenisation method.

An example filename—2016-SecureWirelessArchitecture & designoverview page 1.docx—can be tokenised using the abovementioned three level hierarchy into the signature NSTSTSTSN. Decomposing the T tokens, we obtain the signature NSCCCSLSLSN. Further decomposing the L tokens yields NSCCCSWWSWSN. The table comprising FIG. 5 shows the three signatures which each represent the example filename. Each of the three signatures applies a different level of the token hierarchy (i.e. a different tokenisation method). FIG. 6 describes in greater detail how this example filename is tokenised according to three different tokenisation methods. Each tokenisation method has a different token tag vocabulary, and two different signatures: the first signatures in each pair of the signatures has generic tag, S, to represent separators, and the second signatures in each pair of the signatures retains the token strings in the signature rather than representing them with tag symbols.

Other tokenisation methods may be adopted, for example applying a specific separator token tag, s, which preserves the specific separator (e.g. a "-", "_" or "[space]"), as opposed to the generic separator token tag, S.

Tokenisation methods are chosen on the basis of enhancing one or more of the desired honeyfile qualities referred to earlier in the application. Variations in the tokenisation method applied within the one file set are preferred to limit the predictability of the honeyfile content and/or form.

Generating a Honeyfile Filename

In a first example, there are six files in the local set and the entire set is tokenised. The filenames of the six files are as follows:

1. acn_2010_45_september_2014.docx
2. acn-firearmschanges-november2010.docx
3. australiancustomsnoticeno2010-33.docx
4. acn2010-54.docx
5. acn_2010-07.docx
6. acn2010-13importsalestransaction.docx Each of the filenames are tokenised according to six different tokenisation methods, namely the NST method (decomposing filenames into numbers, generic separators and letters), the NsT method (decomposing filenames into numbers, specific separators and letters), and the CLNSU and CLNsU methods as well as the CNUSW and CNUsW methods, each of which are applied to the six example filenames in accordance with the token hierarchy described above.

In this example, 36 different signatures are generated for the 6 filenames, however, depending on the system configuration, fewer tokenising methods may be applied to form fewer signatures. Those 36 different signatures are presented in FIG. 7.

It will be appreciated by the reader that in this example, the tokenisation algorithm which is used to process the lowercase character sequence 'acn' breaks this sequence up into the word 'a' and the sub-sequence of letters 'cn' which is also determined to be a word.

During the tokenisation step, a set is produced that comprises all token strings that have been assigned a particular token tag. For instance, in this example, the set of all token string numbers in the filenames is {2010, 45, 2014, 2010, 2010, 33, 2010, 54, 2010, 07, 2010, 13}. More generally, this set may also be understood as a collection of all the tokens from the set of filenames that have the attribute of being a number, and that have been tagged during tokenisation with tag type N.

In a second example, there are 21 files in the local set and the entire set is tokenised. The filenames of the 21 files are as follows:

acn_0406.docx
acn0407.docx
acn0435.docx
acn0439.docx
acn0446.docx
acn0447.docx
acn0449.docx
acn0451.docx
acn0455.docx
acn0456.docx
acn0460.docx
acn0461.docx
acn04013.docx
acn04039.docx
acn04111.docx
acn04115.docx
acn04116.docx
acn04212.docx
acn04216.docx
acn04217.docx
acn04311.docx The filenames may be tokenised according to a different tokenisation method to those applied in the first example. But for the sake of simplicity, we may consider their tokenised form under the CNsUW method, in which all but one of the filenames is represented by the token tag sequence WWN (the exception is represented by the signature WW_N). Alternatively, under the CLNsU tokenisation method, the majority of filenames are represented by the signature LN, and the outlier filename is represented by signature L_N). As is discussed below in more detail, tokenisation can be used to measure consistency of patterns of data, in this example consistency in filename characters across a set of filenames.

Substitution Method: Selecting a Signature then Substituting by Random Sampling

In this example, four honeyfile filenames are generated. Each honeyfile filename is generated by selecting one of the signatures from the 36 which had been formed during the tokenisation step, see FIG. 7.

Then, for the selected signature (also referred to as an exemplar signature or an exemplar token sequence, or simply exemplar), each of the tokens in the token sequence corresponding to the signature is substituted for one of the strings in the set of all strings having the same token tag as the exemplar signature token which is to be substituted, on a random substitution basis. For example, the last token in the first exemplar signature in FIG. 8, WW-WW-WN has the token tag N; this token is substituted by randomly choosing one of the string numbers in the set {2010, 45, 2014, 2010, 2010, 33, 2010, 54, 2010, 07, 2010, 13} which contains all strings tagged with the token type N in the local set of six filenames. While the substitution is performed on a randomised basis in this example, other substitution methodologies such as those which apply a frequency based approach may be applied to generate filenames which are more aligned with the filenames of the local and/or global set; or more sophisticated or learning based substitution methodologies may be applied to generate filenames with new strings that are not found on the local and/or global set (for example, when substituting for the "N-N" token sequence within an exemplar signature, the "YEAR, -, TWO DIGIT NUMBER" string can be preserved, and where the year in which the honeyfile is created is 2011, the number 2011 may be added to the string numbers in the set of strings tagged with the token type N or otherwise substituted for the token N representing the "YEAR". In this learning-based example, the substitution methodology would learn that a four-digit number followed by a separator and a two-digit number generally represents the year in which a file is created.)

With reference to the third exemplar signature in FIG. 8, WW_N-N, it is noted that the generated filename may result from the application of two different tokenisation methods, CNsUW+CNSUW. In this case, two signatures representing the exemplar filename are chosen, and tags for each token in the exemplar token sequence are sampled from the two signatures in proportion to parametrised probabilities (0.8 for CNsUW and 0.2 for CNSUW in this case). This provides greater variability in exemplar signatures than using a single signature. The fourth exemplar signature, WNN-N, may be generated in a similar fashion.

In this example, all file formats on the local set, and all file formats which are generated are documents (having the format of a .docx file). However, depending on the system configuration and/or the surveyed global set of the same file system in which the local set is located, other file formats may be produced, such as .txt files or .pdf files.

Detecting Sequence Structures

Signatures represent a filename with symbols (i.e. tags) from a small vocabulary. This permits learning and sampling techniques to be applied in filename generation even with small local sets. Learning and sampling techniques may also be used when creating other honeyfile content such as metadata and text, and this is described elsewhere in the specification.

Recognising structural regularities of filenames across a set of filenames can be useful in the context of applying learning techniques. A structure score may be applied to represent how close the filenames are to each other. One method of calculating a structure score is by a computing measure such as the average variance of the pairwise Levenshtein edit distances between the signatures representing the filenames. For example, applying this computing measure in the example of the set of 21 files with very similar filenames, the structure score is 0.05, and in the example of set with 6 files having quite diverse filenames, the structure score is 3.64.

Generating Novel Signatures by Application of Learning Methods

A variety of machine learning methods can be applied to create novel signatures (novel token sequences) from the structure of the tokenisable data (e.g. the signature structure in the context of filenames). One example of a machine learning method involves the learning of conditional sequence probabilities, that is learning from the tokenised file set the probability of a next token in the token sequence given the preceding tokens have already been resolved. Such techniques may use a seed token (i.e. initial token in a token sequence) which itself may be chosen based on probability distributions which reflect the content of a surveyed file set. Other techniques may be applied, for example use of neural network architectures to learn layer weightings that encode probabilities of the next token given a sequence.

As a particular example, learning methods may apply n-grams to exploit an understanding of the conditional distributions of partitions of n-grams that appear in a local and/or global set. N-grams are discussed more generally elsewhere in this specification as a means of generating novel exemplar tokens sequences.

For example, using the local set of 6 filenames above, a model can learn that the sequence W-W is followed half the time by W and half the time by N. Applying the model which has learned to predict the next token after W-W, an example novel signature WW-WW-WW may be generated which results from application of this model to the CNsUW signature for acn-firearmschanges-november2010.docx. Using a seed and sampling from these probabilities for all the tags that appear in the training set, other novel signatures can be generated, such as N-N_NWW-WW. In this process, the model learns the probability of the next character for each sequence of a certain length (3 in this case) in the training set, and then sample from these probabilities for as long as required.

It is noted that this very small sample size for learning is dearly for illustrative purposes only, as such a small sample size is not a realistic basis for learning.

In another illustration of a learning-based method, having reference to the example set of 21 files, we note this shows a very structured set of filenames. All except the first file have a common name structure of 'acn' and then a four-digit number. The exception has an underscore as a separator. The entire filename set has a structure score using the CNsUW tokens of 0.05. Ignoring the filename with the underscore separator character, the structure score is 0. The structure score can be a factor which is consider when choosing a strategy for novel filename synthesis. For example, the novel filename "acn0502.docx" may be created by retaining the common text component "acn" and adding a randomly generated four-digit number which does not appear in the set of numbers taken from the 21 filenames.

Sampling from Strings

Given a signature, strings can be sampled to populate the tokens of a honeyfile filename by sampling by tag proportional to frequency from the local set strings or from a combination of local and global set strings. The signature can be sampled directly from the local set or generated from a seed as described above.

2. Metadata

The metadata associated with a honeyfile is important to maintaining its credibility. Files with salient timestamps or inconsistent user and group identifiers are easier to recognise as bait without inspecting content.

In one application, a sampling-based approach may be used in respect of the metadata extracted from the surveyed set of files POSIX filesystems, among others, are suitable where ownership and permissions metadata is associated with files on the filesystem.

Ownership and Permissions Metadata

User and group identifiers, and access permissions are sampled from the joint distribution of their values. This is done to ensure that no instances of implausible combinations appear, since these may be recognisable to an intruder.

The ownership and permissions metadata for each file on a filesystem can be treated as a vector of strings for the surveyed set. The elements and length of the vector may vary across filesystems or document repositories, but the method remains the same:
1. Compute the incidence frequency of each unique vector in the local set and normalise so that each unique vector has an associated probability;
2. For each honeyfile created, sample a vector proportional to the probabilities.

The filesystem metadata can be extracted so that the user id is represented by UID, the group id is represented by GID and the access permissions are represented by AP.

For example, with reference to FIG. 9, the table shows an example of a set of vectors of user and group identifiers and file mode (i.e. the access permissions associated with the file). The GID, UID and AP of a honeyfile are substituted for vectors having the appropriate elements and length according to their probability distribution in the file set, by sampling from the set according to the relatively frequency of the unique vectors: see FIG. 10.

Timestamps

Each file can have access, change and modify timestamps, amongst other timestamps, so each file has an associated vector of these timestamps. In the POSIX specification, for example, the relevant timestamps may be atime, ctime and mtime.

For the purposes of this section, it is assumed that a file can be created with any desired timestamps. Where this is not possible, honeyfiles must be generated and subsequently modified so as to mimic actual file generation.

When substituting timestamp tokens in an exemplar token sequence, sampling should not be performed from the joint distribution of timestamps, since this would create an unlikely repetition of exact minute and second values, compromising the authenticity of the honeyfile. However, the daily and weekly patterns characteristic of files produced on a file system with multiple contributors should be preserved, so that a typical number of file creation and modification timestamps are generated for normal workdays as well as evenings and weekends, for example.

Accordingly, the present invention may sample with the following scheme:
1. For each timestamp in the local set, extract the date (e.g. year-month-day) and hour-of-day components;
2. Compute the frequency of appearance of dates and hour values in the local set, to yield distributions;
3. For each honeyfile created, sample a date vector and an hour vector proportionally to their appearance frequencies; and
4. Append each date element in each date vector with minutes and seconds sampled uniformly from the domain [0-59].

In the sampling approaches above, it may be preferable to combine the distribution for a directory (also called a local set) with the distribution for a larger sample such as a whole repository, called a global set, for example. This provides more variety, and is particularly useful when directories contain small numbers of files. Distributions can be combined by computing a mixture distribution with mixing ratio k. Given two distributions, probabilities for the mixture are calculated as $p=k\ p1+(1-k)p2$.

The possibility exists that an incongruous combination of dates and ownership could be generated, such as the creation date of a file before a user was added to a network, or after someone has departed a company. This can be overcome by combining the identifiers and permissions with the timestamps as vectors and sampling as above. This may, however, result in too little variety in the resulting metadata when using small folders. An alternative is to limit the date selected for a user to be bounded by the earliest and latest dates observed for a user.

Edge Case

A notable edge case occurs with a strictly named sequence of files, such as those automatically generated by a process. In some such cases, honeyfiles preferably have timestamps consistent with the sequence ordering.

Figure 11B:
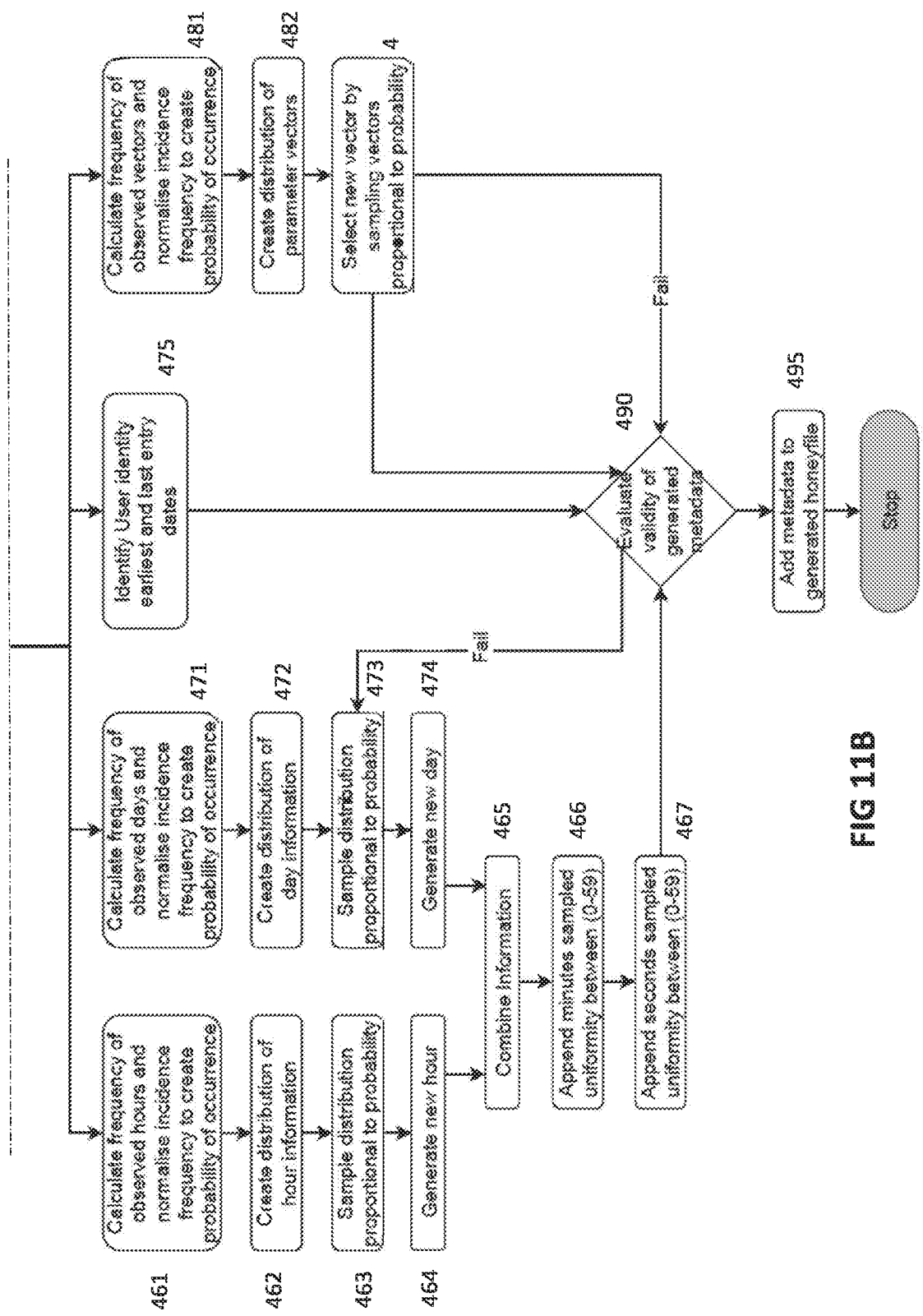
FIG. 11 (FIG. 11 is a continuous split sheet as FIG. 11A and FIG. 11B) is a process flow diagram for the subprocess of generating metadata content according to a preferred embodiment of the invention.

According to a preferred embodiment, FIG. 11 provides a process flow diagram for the sub-process of generating honeyfile metadata. In the first step the number of files in the local set are identified 400, and then for each file, the metadata is identified 410 and extracted 420. In this particular embodiment a range of metadata in the local set is extracted, including timestamp, user identifiers, group identifies and permission metadata. The next step is to determine whether the data is timestamp related 430; if it is, the hour and date information are extracted 431, 432; and if it is not, the other type metadata are grouped together into a single vector 435. The extracted information is then stored 440.

When all the relevant metadata has been extracted, the next step is to combine and correlate the stored metadata for the local set 450.

Analysis is then performed on the combined data, including the following in relation to timestamp metadata:
calculating the frequency of observed hours and days, normalising the incidence frequency to create a probability of occurrence: 461, 471;
creating a distribution of hour and day information: 462, 472;
sampling the distribution proportional to the probability such that more regularly occurring hour and day metadata is more likely to be selected than rarely occurring hour and day metadata: 463, 473;
generating a new hour or day honeyfile metadata using the probability-based sampling: 464, 474;
combining the generated hour and day honeyfile metadata, 465;
appending minutes to the honeyfile metadata sampled uniformly between the numbers 0 and 59, 466;
appending seconds to the honeyfile metadata sampled uniformly between the numbers 0 and 59, 467.

As for the non-timestamp related data, on the specific question of user identity, analysis is performed to identify the user's earliest and last entry dates: 475 in order to set boundaries of activity regarding user identity for non-timestamp related honeyfile metadata. Analysis is also performed in calculating the frequency of observed vectors which were generated earlier in the process (435) and normalising the incidence frequency to create a probability of occurrence 481. A distribution of parameter vectors can then be generated, 482, and a new honeyfile vector can be selected by sampling the generated vectors according to probability 483.

If the newly created timestamp-related honeyfile metadata, and the honeyfile vector, meet system and/or user defined validity criteria during evaluation step 490, then that honeyfile metadata may be added to a honeyfile 495. In the present embodiment, validity evaluation for metadata is a further checking process in that criteria further to those which inherently inform the parameters of honeyfile metadata creation are added, such as those evaluation measures set out in the Summary section of this application.

If the newly created timestamp-related honeyfile metadata, and the honeyfile vector, do not meet system and/or user defined validity criteria during evaluation step 490, the metadata is sent back to processing at the samplings steps 464, 481, and the process flow recommences at that stage.

3. Honeyfile Text

A number of text generation methods are contemplated by the present invention. Such methods may include variations on a substitute-in-place strategy. For example, a block of text, which may be a whole document or composed of fragments from a number of documents, is used as a template. The text block retains its logical structure, sectioning (e.g. chapter, section title, subsection) and formatting. In this example, individual words or phrases are tokenised so that their semantic and/or syntactic attributes are resolved, and the tokens are then substituted in the text block by any of the methods described below.

Language-Based Tokenisation

Replacement tokenisable data is formed by tokenising text in files on the file system into tokens with word or phrase strings and tags. Punctuation and stopwords are able to be left intact in generated text, in which cases the strings are retained in the signatures rather than being replaced by tags and then substituted, similarly to filename tokenisation.

The tokenisation can take the form of distinguishing words and punctuation in the text and tagging them. In this case the token sequence has the vocabulary of tags W and P, and token strings are the words and punctuation symbols. This form of tokenisation can be extended by using the part-of-speech (POS) of each word as the tag, so that the vocabulary includes tags such as NOUN, VERB, ADJ and other standard parts-of-speech.

Phrases can also be used as the tokens. The standard linguistic decomposition known as dependency parsing can separate text into sub-phrases such as noun phrases, verb phrase and other components. A straightforward version of this is to tokenise a sentence into its noun chunks, the remaining phrases and punctuation, yielding a vocabulary of N (noun chunks), O (other phrases) and P (punctuation).

Overlapping phrases can also be used as tokens. N-grams are overlapping length n word subsequences from a text. Setting n and taking the n-grams of a text creates a token sequence with a vocabulary of all the unique n-grams in the text, and the property that the n-grams are both the tags and strings of the token sequence. Each choice of n yields a different tokenisation of a text. POS tags may be included in the tokenisation.

Numbers are usually tagged as such in all the form of tokenisation.

For example, take the text content: The quick brown fox jumps over the lazy dog as depicted in FIGS. 12A to 12D.

Figure 12A:
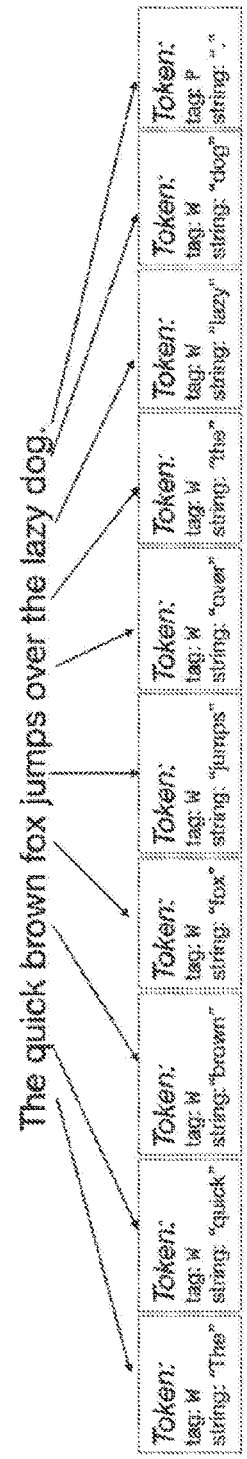
FIGS. 12A-12D illustrate four different language-based tokenisation methods applied to the same text content.
Figure 12B:
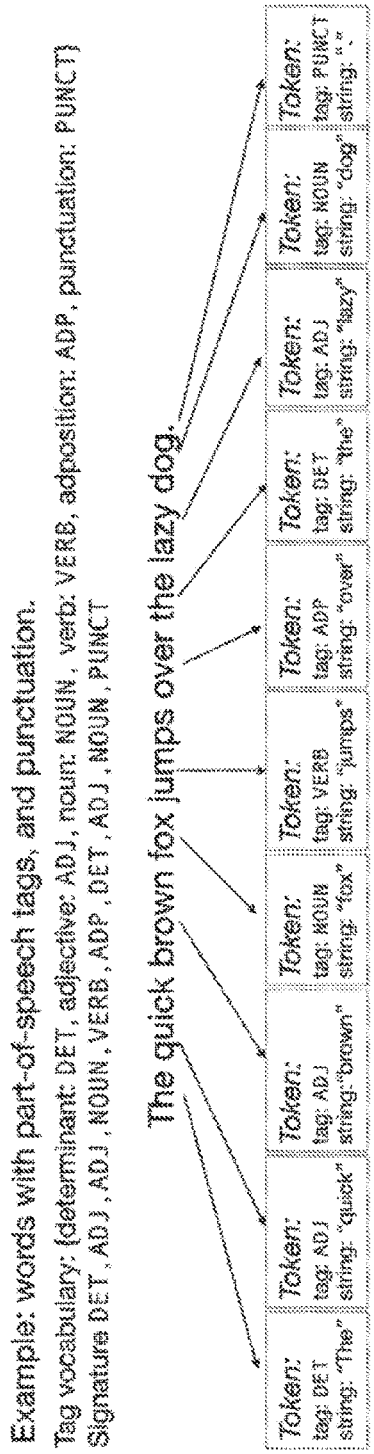

In FIG. 12A, the text content is tokenised by distinguishing words and punctuation in the text and tagging them; In FIG. 12B, part-of-speech (POS) of each word is computed, and assigned as the tag for the word. For both of these tokenisation methods, each token comprises a single word (or punctuation) string and the token tag of the specific tokenisation method which applies to that single word or punctuation string.

Figure 12C:
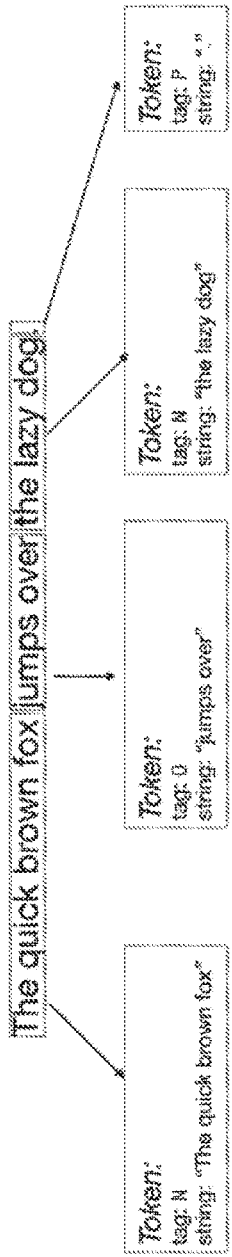

In FIG. 12C, the text content is tokenised by distinguishing noun chunks, other dependency parsed phrases, and punctuation. In this case a string may comprise a number of words, or just one character (i.e. a punctuation symbol).

Figure 12D:
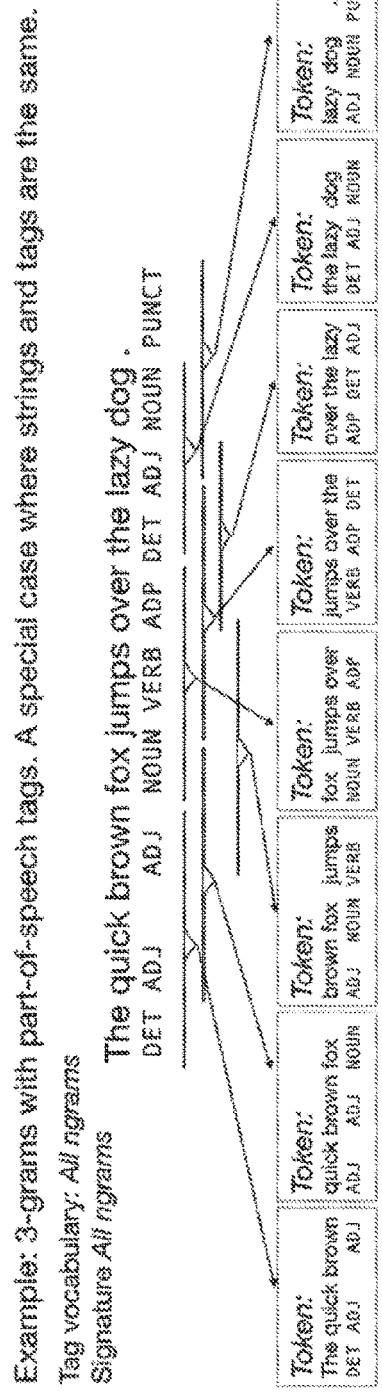

In FIG. 12D the tokens are 3-grams and including the POS tags.

Exemplars and Substitution

As with filenames, exemplar text is selected randomly and guides the replacement of exemplar tokens with tokens or token attributes from the tokenizable data in a local set or global set. The substitution may be based on exemplar tags or tags and strings, in which case a string distance parameter can be used to guide replacement.

Novel token signatures may also be generated, as described for filenames above.

Tokens may be replaced by tokens with the same tag, either by sampling randomly or by sampling proportional to frequency of occurrence.

Alternatively, tokens can be substituted by other tokens of the same token tag type, with a distance measure based on the token strings to guide selection.

In addition, the following optional steps may be taken, with their inclusion being determined by system configuration or user selected parameters:

1. A substitution rate can be set. Defining a probability of token replacement <1 for eligible tokens in the sequence results in some tokens not being replaced. The more tokens left intact, the more human readable the content remains, at the increased risk of exposing sensitive information.

2. Certain tokens, like punctuation and stopwords may not be replaced, retaining the exemplar token string structure. Retaining punctuation, for example, helps to retain sentence structure, or retaining line breaks between paragraphs in a document helps to retain the document structure. In this way, such elements can be tokenised as structural tokens. This process can similarly be followed in filename tokenisation.

3. Substitution can be selective. We can choose to not substitute numbers, named entities or other particular tags, or choose to replace them at different rates.

4. Substitution can be topical. Crucially for the keyword searchability of topics of interest in a repository, we can choose not to substitute words or phrases associated with a topic of interest in the local set. A topic model can be computed on the text content of the local set using Latent Dirichlet Allocation or a similar algorithm known to the skilled addressee, and the top n words from each topic left intact or substituted with a low rate. Retaining topic words improves attractiveness, at increased risk of exposing sensitive information.

5. Honeyfiles may be assembled from fragments drawn from a number of documents.

String Distances

Token substitution can make use of the token strings to guide substitution. This approach is particularly useful in honeyfile content generation where the realism and enticement of a honeyfile can be traded off against the exposure of sensitive information. The meaning embodied in an exemplar token can be evaluated against available substitute tokens and the substitution guided as a result.

The present invention uses Vector Space Models to measure the semantic distance between the exemplar and substitute tokens to control the semantic distance between honeyfile content and the real content it is derived from.

VSMs can be understood as a means to represent words as vectors. In the present invention, it is contemplated that such vector embeddings may be computed from words and their neighbourhood contexts by approaches which include the decomposition of co-occurrence frequency matrices which understand the probabilities of word and context appearing together based on counting of co-occurrence in the surveyed file set. Other methods may also be used to generate word vectors, such as those which apply window-based predictions and machine learning to update vector representations of words and contexts, for example word2vec, Fasttext, GloVe (Global Vectors) or sense2vec. The Levy-Goldberg dependency based method (referred to below as LGD) is one suitable method that is adopted herein for illustrative purposes.

Such vector space embeddings have the property that words that are used in a similar context, and have similar meanings, cluster together in the (high) dimensional embedding space. Expressed another way, words similar in meaning are closer in the vector space, and similarity diminishes with distance. Words or phrases in a piece of text from a real document, with such semantic control, manages the trade-off between enticing realism and potential inclusion of sensitive content in the honeyfile. The approach of this invention is similar in concept to lexical substitution, but for the purpose of the invention the meaning of a sentence is intended to be changed rather than preserved, and this is done in a controllable manner.

Semantic control is demonstrated herein using ranking of cosine distance between word vectors representing token strings. The token strings may be words, or vectors obtained from the words in a phrase by a calculation such as averaging of the vectors.

Other similarity measures may include distances such as Jaccard similarity or Spearman's rank coefficient. The set of candidate replacements can be the tokenised local set or a combination of local and global set. The VSM can be trained on any suitably large text corpus, such as Wikipedia. VSMs are also typically included in the standard models accompanying Natural Language Processing libraries such as Spacy.

The idea is illustrated in FIGS. 13A, 13B, and 13C, showing normalised vectors representing words in a VSM (showing 3 dimensions for illustration, although embeddings are usually of dimension of the order of hundreds). FIG. 13A depicts normalised vectors of a vector space model in three dimensions for generating text content, including a representation of vectors operating as replacement tokenisable data which can be selected in a controlled manner for substitution, and FIG. 13B depicts the same with conic sections, and FIG. 13C depicts sectional vectors with the conic sections. For illustrative purposes, there is provided a (hyper) cone of exclusion by angle around a word w with vector w, and consider substituting a word from the set of vectors with angle θwr such that $$\theta\ min \leq \theta wr \leq \theta\ max.$$

Figure 14:
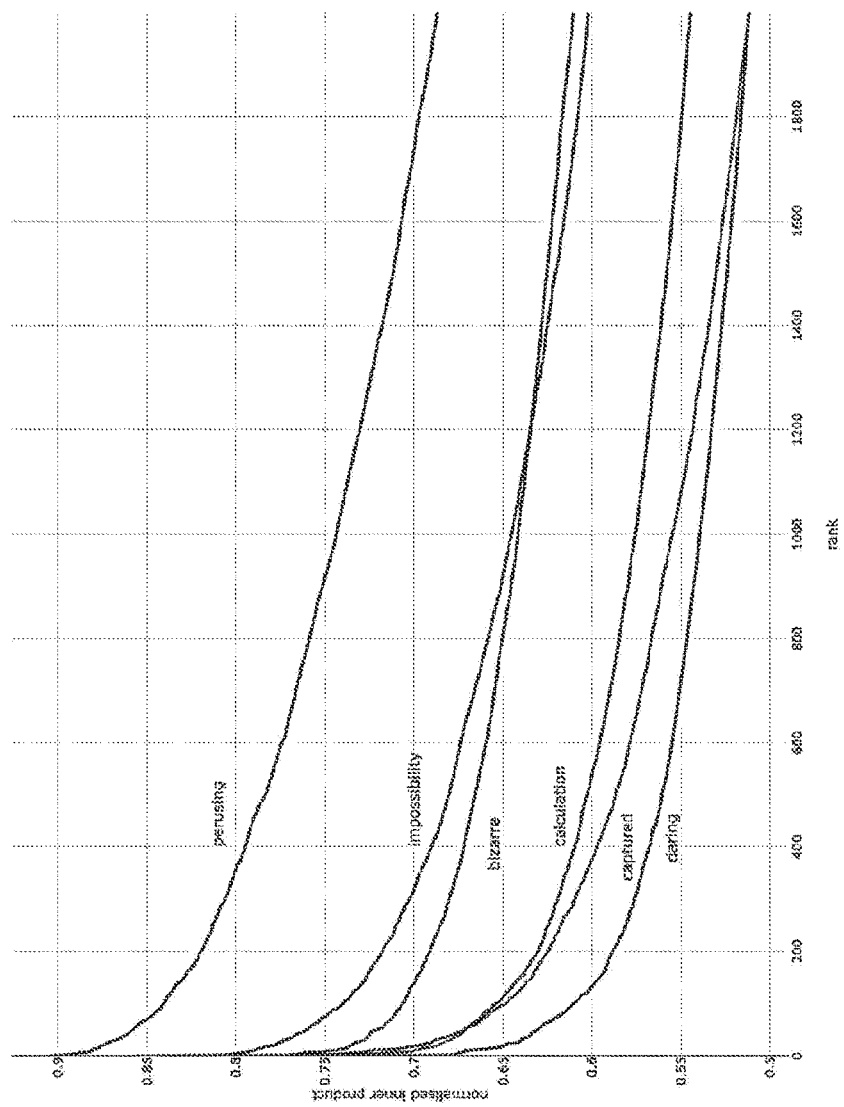
FIG. 14 is a graphical illustration for six example words of the ranked normalised inner product with the 2000 nearest neighbours.

In practice, selecting an angular range is difficult, since the nearest neighbours can vary considerably in inner product and angle, as shown in FIG. 14. An alternative is to select substitution candidates using rank order. Consequently, a rank-based substitution approach may be chosen to samples from embeddings. The plot comprising FIG. 14 shows the ranked normalised inner product with the 2000 nearest neighbours for six example words: "perusing", "impossibility", "bizarre", "calculation", "captured" and "daring". The decay in the inner product for the six example words in FIG. 14 can be interpreted as a reduction of similarity in meaning, such that some words decay (i.e. the proximity of clustered words becomes more obscure) more quickly as the rank increases.

Accordingly, the method of this example substitutes words by sampling from a Poisson distribution with mean k, or similar distribution, where k acts as the semantic distance parameter, from the ranked list of tokens with string distance computed using word vectors.

Text Generated Examples

FIGS. 15A to 15E illustrate text which has been generated by a variety of substitution methods, based on the original text provided in FIG. 15A. FIG. 15B presents text generated by part of speech tagged n-gram sequences.

FIG. 15C is an example of text generated by word (i.e. the tokens are words) replacement by sampling from a VSM, using a publicly available VSM.

FIG. 15D is an example of two sets of text generated by word replacement using words from a local set (directory), tagged with the same part of speech. The variation between the two sets of text is a result of differing parameter choices (e.g. different choices for the substitution rate) and randomness which is built into the process.

FIG. 15E is an example of three sets of text generated by phrase replacement using dependency parsed tokens from a local set (directory). The variation between the three sets of text is a result of differing parameter choices and randomness which is built into the process. FIGS. 15D and 15E use the VSMs bundled with the Spacy NLP library.

Numbers

Numbers appear in text and also in more structured tabular data. Numbers can be treated generically by replacing integers with randomly sampled integers in the range 0-9, except for the first integer in the sequence, which is sampled from 1-9 so that the a leading 0 is avoided. More specific treatment can be provided in the common case of spreadsheets where cells often have specific data types, or by detecting the particular formats of numerical types such as dates, credit card or telephone numbers. Dates can be replaced with a random date, or one sampled from the date range in the data block or column if in a table or spreadsheet.

It will be appreciated by the reader that the text content substitution methods described above may be used in respect of filenames.

Figure 16B:
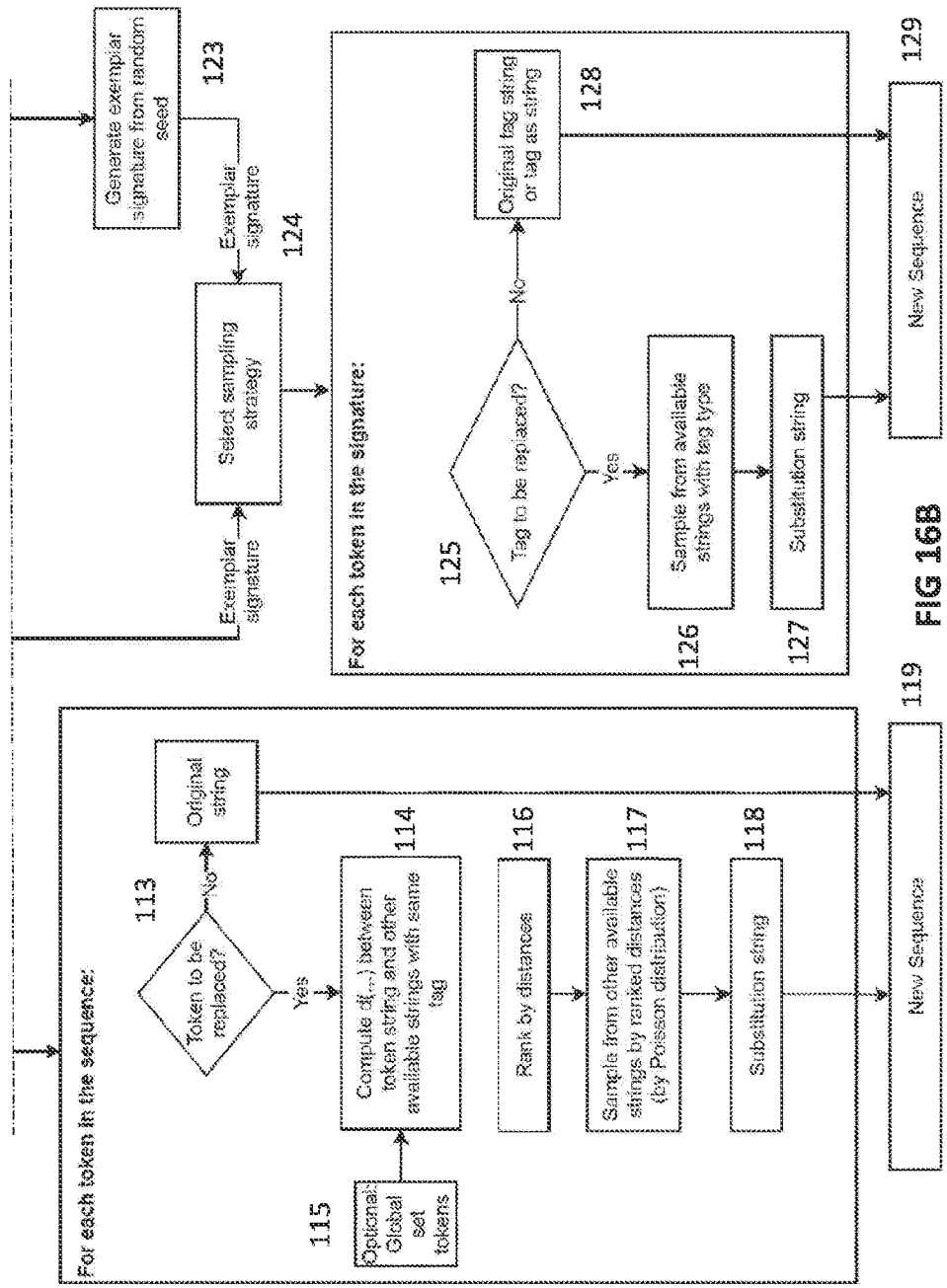
FIG. 16 (FIG. 16 is a continuous split sheet as FIG. 16A and FIG. 16B) is a process flow diagram for generic token substitution process according to a preferred embodiment of the present invention.

In a preferred embodiment, the token substitution process follows the process flow chart depicted in FIG. 16. A first step after the tokenisation step 100 is to determine whether a string distance is going to be used 110. String distance based substitution is preferred in some contexts, particularly where fine control over proximity between a honeyfile and real data is sought, and the decision whether or not to apply it is often determined by the trade-off between realism and preserving secrecy.

String Distance is Applied

If the substitution method does apply string distance, the next step is sampling the exemplar sequence from the local set 111. Prior to sampling, the string distance measure is selected 112. The measure selected for distance in this embodiment is a ranking of cosine distance (i.e. measuring similarity between vector representations of the tokenisable file data and the exemplar token, by using an inner product space that measures the cosine of the angle between them).

For each token in the sequence, the following sub-process is applied:

it is determined whether the token is to be replaced 113 if the token is to be replaced (e.g. the variability control factors such as selectivity, substitution rate, stopwords, etc. do not preclude substitution) the distance between the exemplar token string and other available strings in the local set having the same tag is calculated 114 optionally, the process may include computing distances for the global set 115 if the token is not to be replaced, the original string corresponding to that token is preserved for replacement tokens, the distances are ranked using the selected measure 116 sampling is performed of available strings (i.e. strings which meet the distance settings) based on ranked distances 117. In this embodiment, sampling is performed by sampling from a Poisson distribution to yield the substitution string from the ranked list 118.

the replacement tokenisable data comprising a new sequence is generated 119. The new string sequence is a combination of substitution strings and original strings), and this is ready to be packaged into a honeyfile.

String Distance is not Applied

Where the substitution method does not apply a string distance measure, there are two options selecting or generating an exemplar token sequence 120. If an exemplar token sequence is selected, this is done by sampling from the local set 121. If an exemplar token sequence is to be generated, the appliance must learn conditional transition probabilities from token sequences in the local set 122. From this learning, the appliance generates an exemplar token sequence from a randomly chosen seed 123. Once the exemplar token sequence is chosen, the sampling strategy is applied 124: in this subprocess following steps apply:

It is determined whether the tag is to be replaced 125

If the token is to be replaced (e.g. variability control factors permit this), then then sampling of tokenisable data in the file set having the same token tag is performed 126, to produce a substitution string 127

If the token is not to be replaced, the original string corresponding to that token is preserved The replacement tokenisable data comprising a new sequence is generated 129. The new sequence is a combination of substitution strings 127 and original strings 128.

Figure 17B:
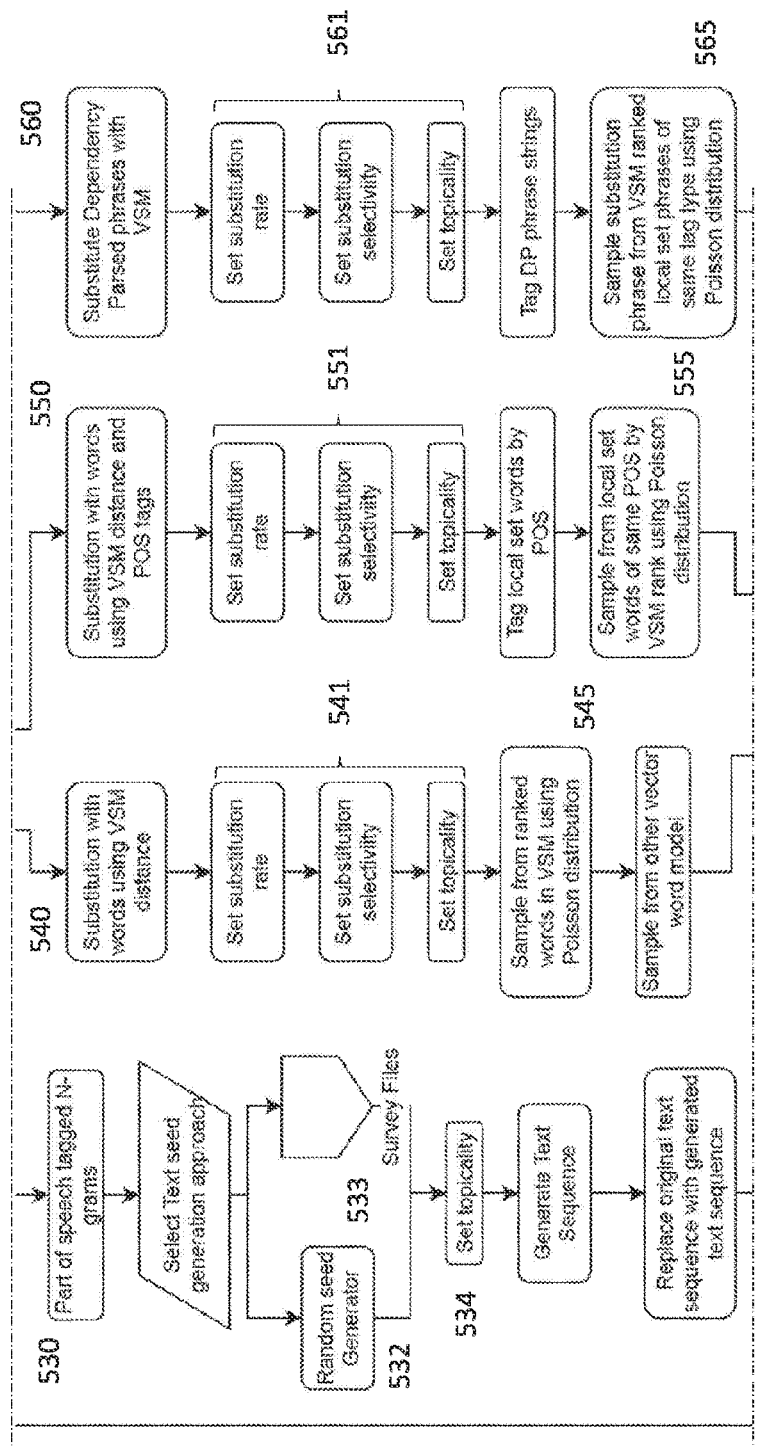
FIG. 17 (FIG. 17 is a continuous spilt sheet as FIG. 17A and FIG. 17B and FIG. 17C) is a process flow diagram for the subprocess of generating text content according to a preferred embodiment of the invention.
Figure 17C:
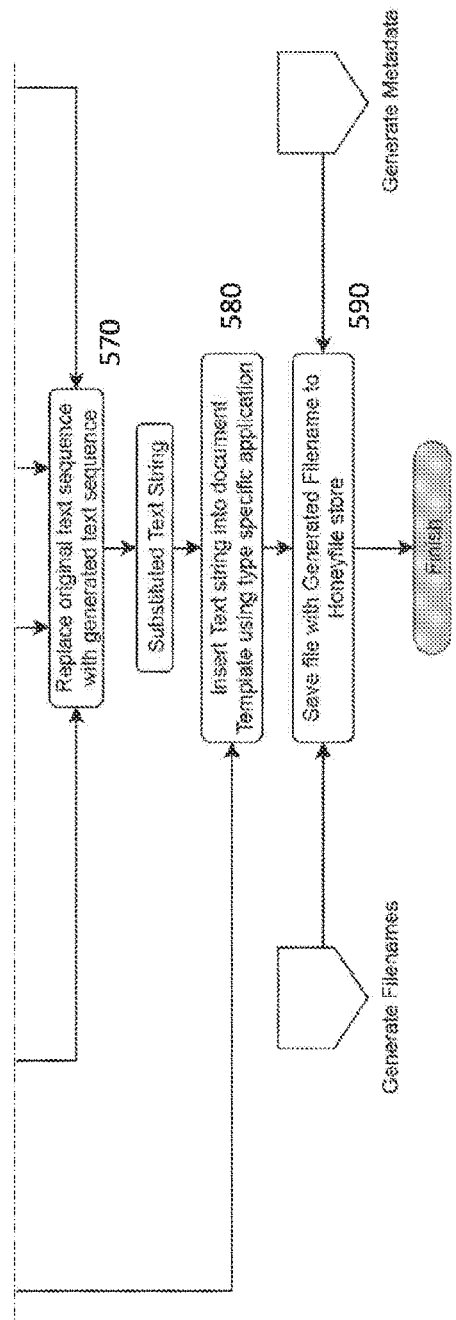

According to a preferred embodiment, FIG. 17 provides a process flow diagram for the sub-process of generating honeyfile content. In the first few steps, a document is selected to be used as exemplar 500, then it is converted into raw text and processed using NLP, then with use of the surveyed file set data, the raw text is able to be substituted with local and/or global set text 510. Raw text is substituted using a randomisation of substitution technique approach 520. The different substitution methods include the following:

Part of speech tagged N-grams, 530;
Substitution of words using VSM distance, 540;
Substitution of words using VSM and POS tags, 550;
Substituting Dependency Parsed phrases with VSM, 560;

Each of the VSM substitution techniques permit setting of the substitution rate, substitution selectivity and topicality 541, 551, 561; and they provide for sampling from ranked words using a Poisson distribution 545, 555, 565. The POS tagged N-gram substitution technique 530 includes two options for text seed generation 531: a random seed generator 532 and a selection of text based on surveying the file set 533 sampling according to frequency; topicality can also be set in this substitution technique 534. Finally, the original text of the template document is replaced by the generated text 570 and that text is inserted into the original exemplar document taking into account the specific document type 580. The file is then saved to the honeyfile store with a separately generated honeyfile filename and honeyfile metadata 590.

Local or Global Set

In any of the substitution approaches above, it may be preferable to combine the distribution for a directory with the distribution for a larger sample such as a whole repository, for example. This provides more variety, and is particularly useful when directories contain small numbers of files. Given two distributions, probabilities for the mixture are calculated as p=k p1+(1−k)p2.

Metadata Specific Applications

The specification discloses at least one generic application which may be applied to a wide range of data on a filesystem, and at least one application which has specific application to metadata.

Other Applications

Figure 18C:
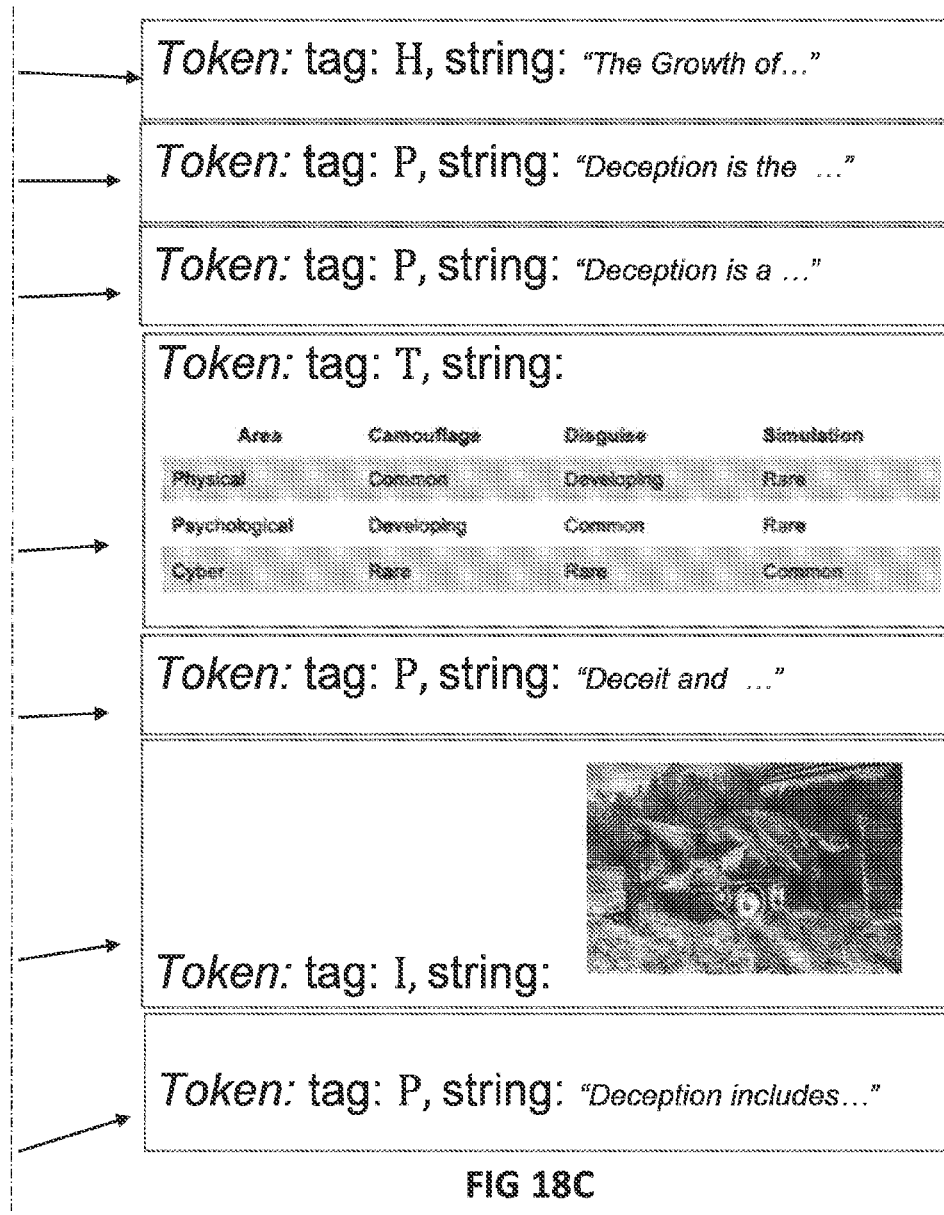
FIG. 18 (FIG. 18 is a continuous split sheet as FIG. 18A and FIG. 18B and FIG. 18C) is an example of a tokenisation method applied to a document such that the document is segmented into structural components, including the tag vocabulary and the signature corresponding to that tokenisation method.

Tokens are not limited to representing the data corresponding to filenames, metadata or text content. A variety of other content may be tokenised, including images, tables, graphs, entire paragraphs or other text or structural components. For example, referring to FIG. 18, the structure of a document can be understood by application of the exemplified tokenisation method which segments and distinguished between titles, paragraphs, tables, and images.

Honeyfile Lifecycle Management

Honeyfiles should have a lifecycle that resembles that of other files in the local set. The timestamps and other content should thus continue to evolve after file creation. With reference to timestamps more particularly, the file evolution process can also be used to create files with realistic timestamps in the case that the file repository does not allow setting of new file timestamps that are retrospective. More broadly, the process of honeyfile management is depicted in FIG. 3 and the accompanying description above.

Server Overview

Figure 19A:
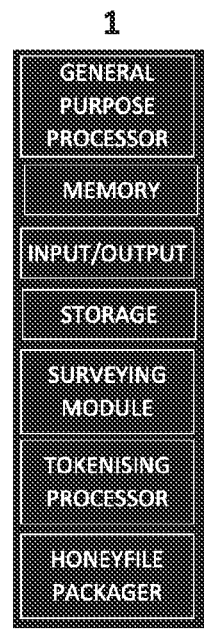
FIG. 19 is a schematic diagram of hardware components of an example system for creating deploying and/or managing honeyfiles and FIG. 19A is a schematic diagram of selected operations components of the example system.
Figure 19:
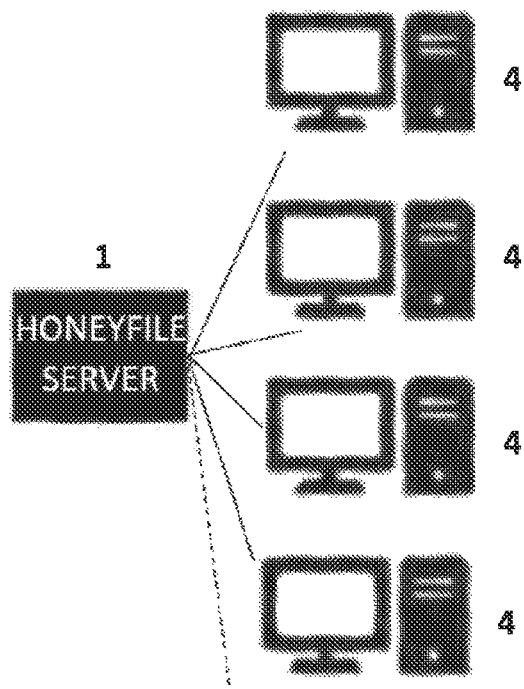

FIGS. 19 and 19A depicts hardware components—that is, at the physical level—of a honeyfile server 1 as described herein. The honeyfile server 1, contains a processor, memory elements, storage, and input/output means for performing the steps of the method. In a preferred form, the server may comprise a Linux box, capable of operating software able to perform the steps of the method. The server may be a virtual or a real server.

In more detail, the particular honeyfile server 1 is connected to a plurality of designated user devices 4, each device including a processor and file system. The the honeyfile server 1 interacts with the user devices 4 via an electronic communications network, and accesses the file systems of each of the user devices 4, including by receiving as input file sets on the file systems, after receiving instructions from one or more of the devices 4 to initiate a honeyfile creation, deployment or management action. As depicted in FIG. 19A, the processor of the honeyfile server, once a file set has been received, undertakes the steps of: surveying the file set in a surveying module to identify tokenisable data in the file set; transmitting the identified tokenisable data for tokenisation in a tokenising processor, forming an exemplar token sequence in the tokenising processor, and applying a substitution method to substitute tokens of the exemplar token sequence with replacement tokenisable data in the tokenising in the tokenising processor 8; the tokenising processor then transmitting the replacement tokenisable data to a honeyfile packager for packaging the replacement tokenisable data into a honeyfile.

Each of the surveying module, the tokenising processor, the honeyfile packager being located in the honeyfile server 1, as shown in FIG. 19A. The honeyfile server may also include a honeyfile deployer module for deploying a created honeyfile, and a honeyfile management module for managing honeyfiles on a filesystem (not shown).

Figure 20:
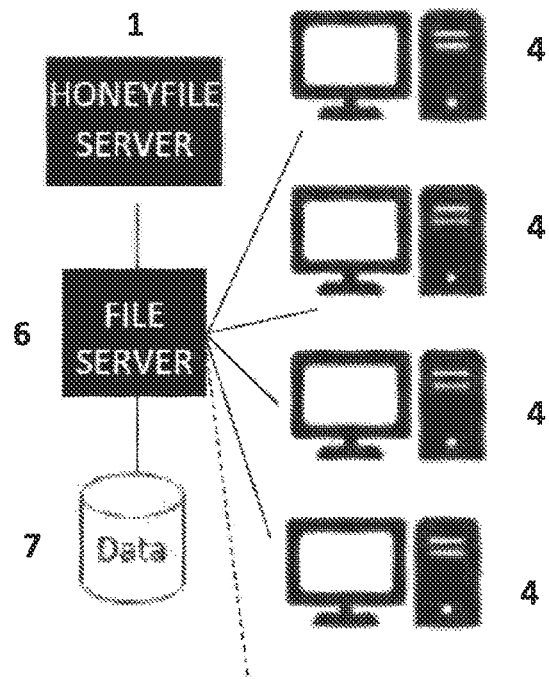
FIG. 20 is a schematic diagram of hardware components of a second example system for creating, deploying and/or managing honeyfiles.

An alternate configuration of an example system is shown in FIG. 20, wherein the system is substantially the same as the system depicted in FIG. 19, except that the honeyfile server 1, is connected to a file server 6, which operates to provide access to the shared file system 7 by the user devices 4. The honeyfile server in this configuration therefore operates on a single file system 7 shared by the user devices 4 as opposed to the individual file systems of each of user devices, as depicted in FIG. 19.

Figure 21:
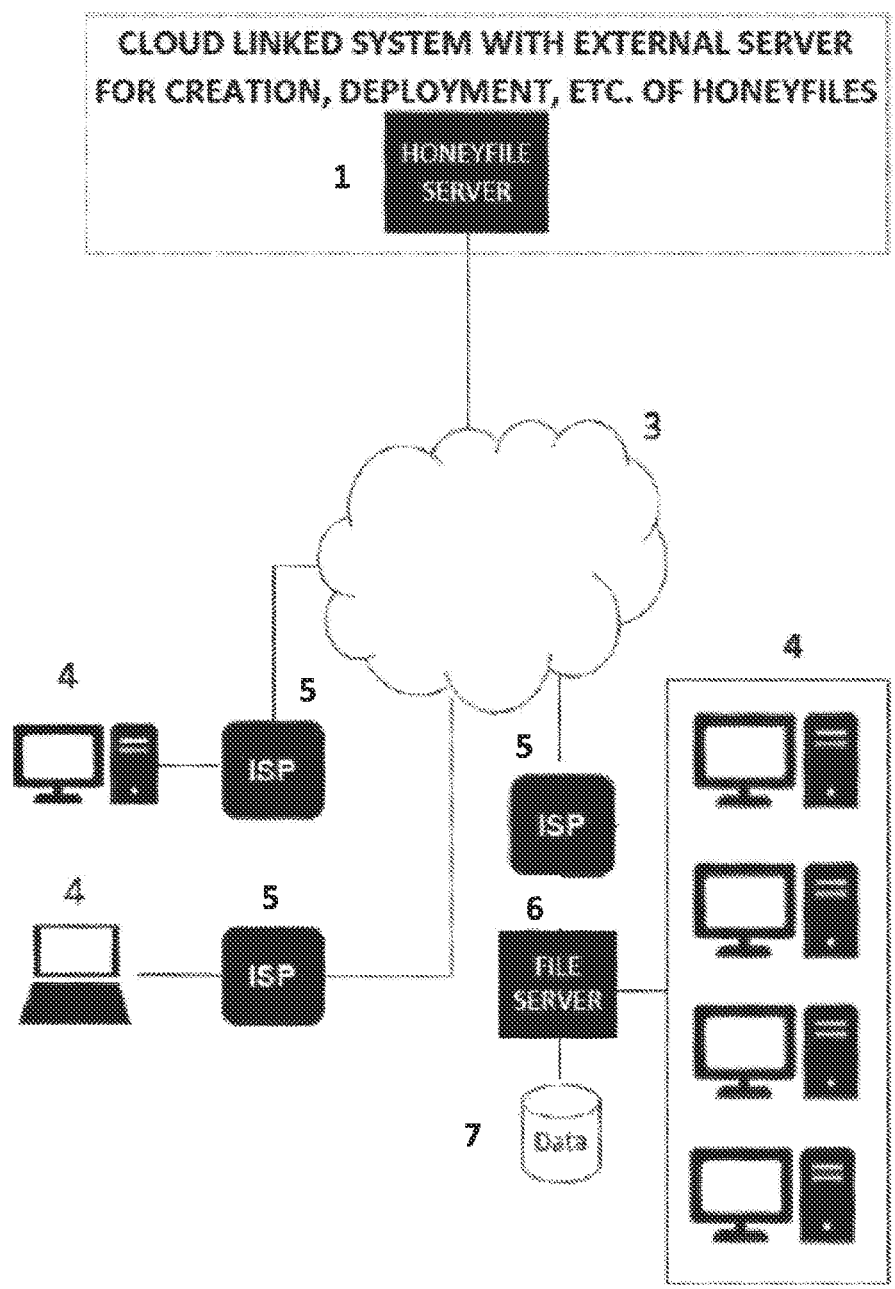
FIG. 21 is a schematic diagram of hardware components of a third example system for creating, deploying and/or managing honeyfiles, comprising a cloud linked system

A further configuration of an example system is depicted in FIG. 21. The honeyfile server 1 contains the same components described in FIG. 19A. As an example, the server may be a server machine running a Microsoft Windows™ operating server and the honeyfile server 1 sends/receives requests and sends/receives acknowledgement and other data from the processor which resides on an external fileserver 6 connected to a shared filesystem 7. As an example, shared file system 7 may be hosted by an external agency, and is accessed by the server 1 over a secure Internet connection.

The honeyfile server 1 (and file server 6) is connected to the Internet 3. The honeyfile server 1 is connected over the Internet 3 by a plurality of user devices 4, for example an individual computer or a group of networked computers, using fixed or mobile broadband, wireless hotspots, satellite or dial-up connections through respective Internet Service Providers 5. Access to the server honeyfile 1 is restricted by, for example, a firewall and other known network security measures. The honeyfile server 1 includes a web server, for example the Microsoft IIS™ web server, to serve web page requests. User interaction is permitted through screens for actions displayed on a web page.

Physical Hardware—Server and User Devices

As is now described for completeness, embodiments described and depicted herein rely upon various computing platforms used to implement the client-server architecture described particularly in connection with FIGS. 19-21, arranged to interoperate via the Internet 3 in FIG. 21. Implementation is dependent upon development and deployment of interoperating computer programs able to be executed within respective selected computing platforms and their accompanying operating systems.

Figure 22:
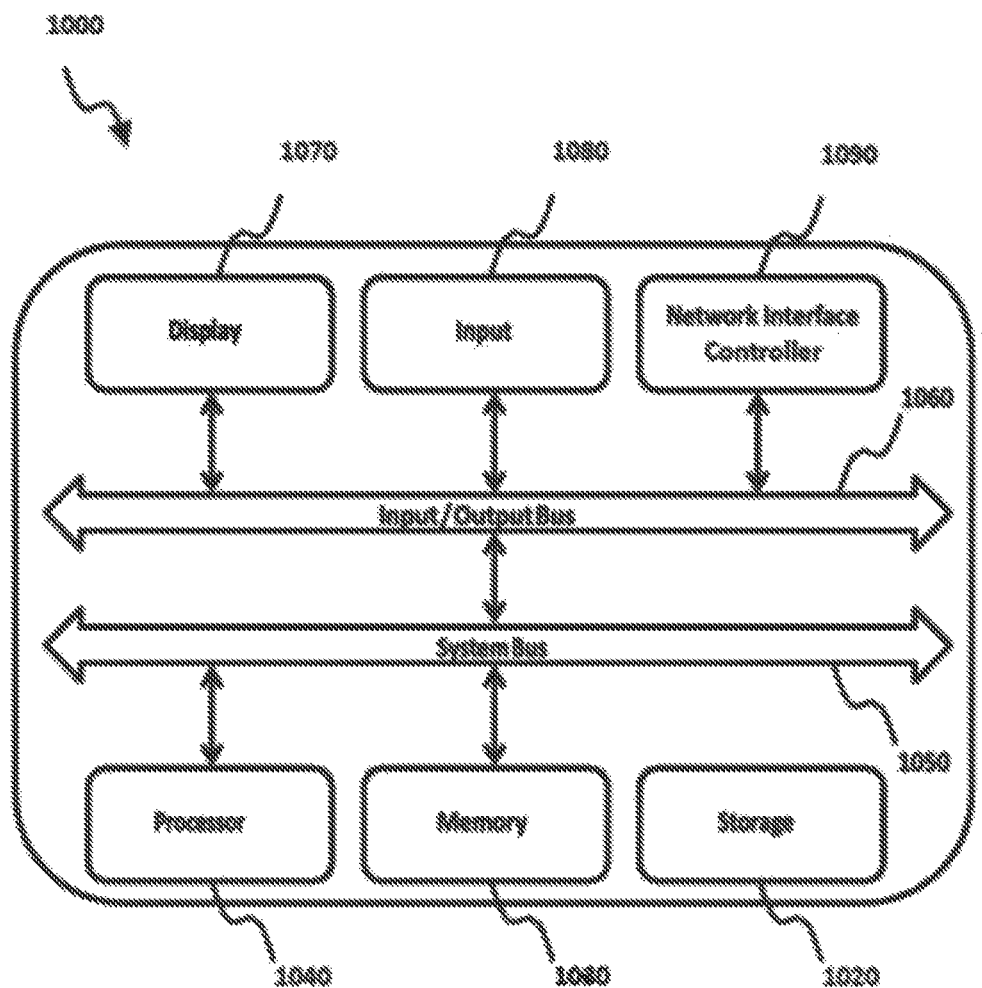
FIG. 22 is a schematic diagram of a generic hardware architecture—at the physical level—that can be generally used to implement hardware components of FIGS. 19 to 21.

FIG. 22 depicts an architecture of a computer system 1000 in schematic form, representative of a generic computing platform suitable for implementing the described system. This architecture abstracts the physical-layer hardware details, which are differently implemented across manifestations of the honeyfile server 1 and user devices 4.

The computer system 1000 includes in its principal components a storage 1020, a memory 1030 and a processor 1040, each of which is interconnected via a system bus 1050. The system bus 1050 is linked to an input/output bus 1060, which interfaces with a display 1070, input 1080, and a network interface controller 1090. The network interface controller 1090 is configured to permit intercommunications with a network external of the computer system 1000.

The storage 1020 provides a non-volatile data storage medium for storing application data and executable code, and is typically flash memory, or other data storage device such as a magnetic hard disk drive. The memory 1030 is a random-access memory used to load executable code and application data from storage 1020.

The processor 1040 executes instructions of a computer program loaded from memory 1030 by performing the basic arithmetic, logical, control and input/output (I/O) operations specified by the instructions. The processor 1040 includes at least a central processing unit, and may be supported by ancillary processing units for performing specialist functions—such as dedicated graphics processing.

The display 1070 provides a visual window to a user, who can interact via input 1080. The input 1080 in the example of a personal computer or workstation includes a keyboard and mouse. Alternatively, in the case of a tablet or smartphone the input 1080 includes a touchscreen layered over the display 1070, and responsive to input gestures.

The network interface controller 1090 provides a port for the computer system 1000 to communicate by transmitting data to and receiving data from a network (not shown, though includes the Internet 3), and implements electronic circuitry required to communicate using a specific physical layer and data link layer standard.

The network interface controller 1090 is configured to interoperate using wired standards such as Ethernet or Token Ring, or wireless standards such as provided by the IEEE 802.11 Wi-Fi standard, or ITU-R 4G cellular standard. This provides a base for a full network protocol stack, which permits large-scale network communications through routable protocols, such as Internet Protocol (IP) over the Internet 3. Connection to the Internet is typically mediated via a firewall server or proxy server.

The client-software architecture implements a particular software design and architecture, distributed amongst both honeyfile server 1 (or file server 6) and user devices 4. Processing is conducted co-operatively as required though principally at the server 1, with some minimal processing executed at the user devices 4, and local data caching and synchronisation with the honeyfile server 1.

An application at the user device 4 includes, a presentation layer, or user interface, an application layer, and a data layer is implemented by computer programs installed and executing are deployed. Software implemented at the honeyfile server 1 includes one or more server programs executing by the honeyfile server 1 within the server operating system. These server programs implement domain logic, which encodes how data can be created, displayed, stored, and changed, as contrasts with the remainder of the software comprising application logic which is primarily concerned with lower-level details of managing a database or displaying the user interface, system infrastructure, or generally connecting various parts of the program.

Software implemented at the user devices 4 vary according to computing platforms, but may be implemented as stand-alone apps (for smartphone or tablets, which tend to rely upon a touchscreen for input) under mobile operating systems or stand-alone applications (for laptops or personal computers) under desktop operating systems. Regardless of the computing platform, dedicated web browsers can be used to implement a web application via scripting executed by the web browser, under both mobile or desktop operating systems.

Selection of suitable channels for delivery of client software, and favoured environments and frameworks for development is informed by technical requirements and developer skill set. Regardless, client software is designed to present a user interface and application logic, as described in further detail herein.

Software user agents can be utilized to manipulate the content, metadata, and lifecycle of honeyfiles on the system in order to maintain an illusion of realism by changing honeyfile characteristics. The user agents simulate an actual user by duplicating actions performed by typical users of the system. The user agents may also simulate multiple system users who interact with the honeyfiles. For example, a user agent may simulate being a number of different users who "read" a file. A user agent may also simulate being more than one author who changes honeyfile characteristics. Furthermore, in addition to observing how real files are modified by real users, the algorithms also learn to copy certain honeyfiles, and move copied honeyfiles to different locations on the system. The algorithm also learns to occasionally delete honeyfiles.

Machine learning algorithms may be applied to observe how real files are manipulated by real users, and, in turn, train models to run user agents to perform similar manipulations on honeyfiles. That is, after observing real users modify real files, the learning algorithm may train models to generate user agent actions to simulate the same type of progression. The simulation of the same type of progression may include the modifications to the content of a file, the name of the file, and the time between each modification to the file.

Each time a real user interacts with a file, the interaction is logged as an occurrence of a temporal event. Temporal events are sampled from a list of types of events, such as: create; copy; add content; delete content; add comment; and the like. The duration of a time interval between the occurrences of each type of event is observed. A learning algorithm compiles the types of events and the durations between the occurrences of each type of event.

The learning algorithm that has learned the temporal events of real files can then train models on how to run user agents (e.g., to generate user agent actions) to simulate temporal events for honeyfiles. As used in this disclosure, 'to run user agents' and 'to generate user agent actions' are used synonymously. The user agents may manipulate honeyfiles of a given type in a manner analogous to how real users modify files of the same type. For example, real users may create multiple draft versions of text files in succession as the files are revised until the user arrives at a final version of the text file. Such a file may have file names that start at "proposal 0.1.docx" and progress through to "proposal_final.docx," when the file is completed to a finished version. In this example, a machine learning algorithm would recognize each successive version of the file. The algorithm not only recognizes the filenames of successive files, but the algorithm also recognizes the modifications to the content of the file, and the time of each modification to the file.

In this way, the learning algorithm learns the realistic modifications to real files by real users and learns the time distribution of the changes to the real files. By learning the ranges of time intervals between each type of temporal event, the algorithm can determine a temporal distribution of the temporal events. This determined temporal distribution may be incorporated by the user agents to direct the manipulation of the user files.

However, the determined temporal distributions are not the only temporal distribution models that may be incorporated by the user agents. That is, temporal distribution models that are used by user agents to generate time intervals between generated temporal events may be provided by methods other than direct observation of real users modifying real files. In embodiments, the user agents may use a temporal distribution model estimated by one of several approaches to develop different kinds of temporal distribution models. One example of a mathematical distribution which may be used to generate a temporal distribution model is a Poisson distribution.

Further, temporal distribution models may be input based on predetermined values. That is, in embodiments, the temporal distribution model may not be calculated or determined by the learning algorithm but may be based on a values predetermined by a user (e.g., created by a user). Such a predetermined temporal distribution model may be used when there is no, or very little data based on real users modifying real files. That is, a user may estimate time intervals between generated temporal events, and those estimates may be incorporated into a temporal distribution model.

Furthermore, the parameters of temporal distribution of the temporal events may be user supplied. For example, if the temporal distribution is a Poisson distribution, then the event rate parameter of the distribution may be supplied. The event rate is the rate at which the temporal events occur over a given time period.

The algorithm may include simple execution rules to control aspects of the honeyfile manipulations. For example, one such rule may be to not modify a file which does not exist. That is, the trained model running the user agent (e.g., generating user agent actions) may include a rule that the user agent may not create, copy, add content, delete content, add comment, and the like, on honeyfiles that are not already in existence on the server.

Figure 23:
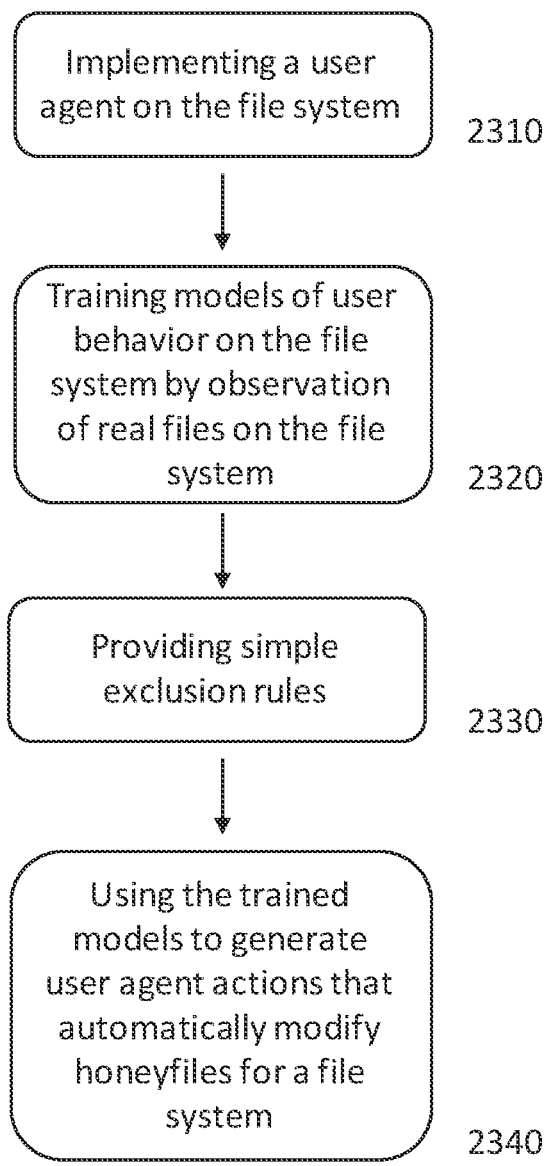
FIG. 23 is a process flow diagram for a the honeyfile automatic modification process process according to a preferred embodiment of the present invention

In a preferred embedment, the honeyfile automatic modification process follows the process flow chart in FIG. 23. The steps of honeyfile automatic modification include implementing a user agent on the file system 2310, training models of user behavior on the file system by observation of real files on the file system 2320, providing simple exclusion rules 2330, and using the trained models to generate user agent actions that automatically modify honeyfiles for a file system 2240.

In embodiments, a user agent may be implemented on a file system.

In embodiments, models of user behavior on the system may be trained by observing real files on the system. As real users modify real files, the interactions by the real users with real files are temporal events. That is, the models are trained by observing real users modifying real files at real time intervals. The temporal events are sampled from a non-limiting list including at least: create; copy; add content; delete content; add comment, and the like. Additional temporal events may be included in the list of temporal events that may be sampled. The time interval between the successive temporal events of a given type may be sampled from a distribution of those temporal events. Some types of temporal events occur more frequently than others. For example, adding content to a text file may be done more often, and repeated more frequently than deleting a text file. The effectiveness of the model training is increased as the differences between the time intervals between types of temporal events is more thoroughly observed and temporal distributions are determined.

In embodiments, simple exclusion rules may be provided. The user agent model may include simple rules of what actions are not to be performed. For example, a user agent may be provided a rule that the user agent is not to modify and/or manipulate a honeyfile that does not exist.

In embodiments, trained models may be used to generate user agent actions that automatically modify honeyfiles for a file system. That is, once user behavior models are trained, they may be used to run a user agent (e.g., used to generate user agent actions) to modify and/or manipulate honeyfiles on a file system without being instructed to do so. The types of modifications to the honeyfiles that may be performed include, in a non-limited list, at least one of creating multiple draft versions of honeyfiles, copying files, deleting files, adding content in files, deleting content in files, replacing content in files, adding comments to file, and the like.

In embodiments, the adding of content in honeyfiles may use text generation methods to add topical content. Such text generation methods may include variations on a substitute-in-place strategy, as described above.

In embodiments, the replacing of content in files may use text replacement methods to replace topical content. Such text replacement may include text generated by word (i.e. the tokens are words) replacement by sampling from a VSM, using a publicly available VSM. In addition, text replacement may include two sets of text generated by word replacement using words from a local set (directory), tagged with the same part of speech. Furthermore, text replacement may include three sets of text generated by phrase replacement using dependency parsed tokens from a local set (directory). Each of these text replacement methods are described in greater detail above. In embodiments, the deleting of content in files may use text deletion methods to delete topical content.

In embodiments, the modifications to the honeyfiles may include simulating having multiple users interact with a file. The multiple users may comprise simulated system users who are simulated to read a honeyfile, and/or the multiple users may include simulated multiple authors who are simulated to modify a honeyfile. Simulating having multiple users interact with a file may comprise generating a typical number of automatic modifications for normal workdays, evenings, and weekends.

In embodiments, a time between the temporal events is sampled. The sampling of temporal time events may include estimating parameters of a temporal distribution of the given temporal events using a learning algorithm. Once temporal distribution parameters for a given temporal event are estimated, the model may determine the time durations between the temporal events for the user agent to automatically modify honeyfiles for a file system. In embodiments, the temporal distribution for temporal events may be a Poisson distribution, or any other temporal distribution as described above.

In embodiments, the modifications to the honeyfiles may cause the honeyfile metadata to be modified.

Figure 24:
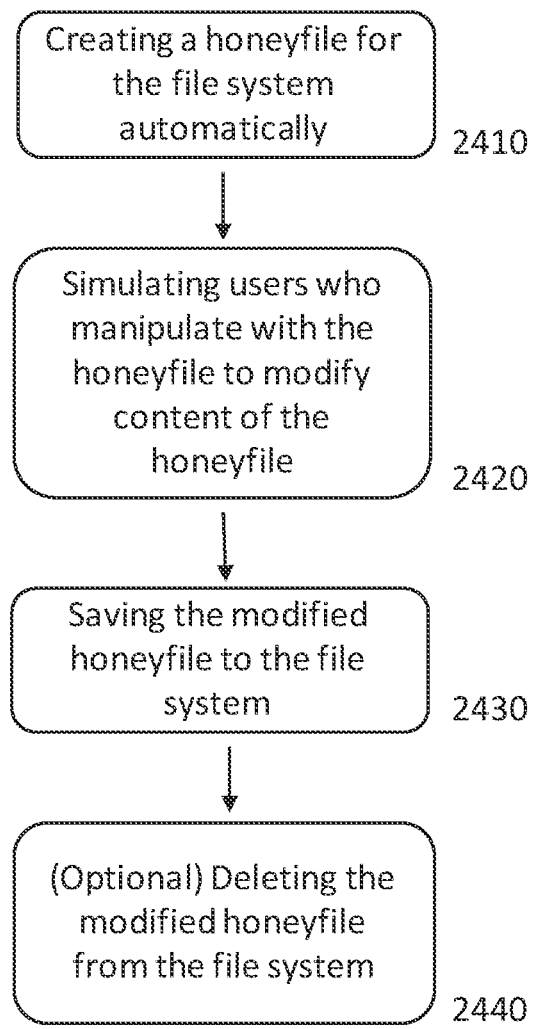
FIG. 24 is a process flow diagram for a honeyfile creation process according to a preferred embodiment of the present invention.

In a preferred embedment, the manipulation of the lifecycle of honeyfiles for a file system process may follow the process flow chart in FIG. 24. The steps of manipulation of the lifecycle of honeyfiles for a file system may include creating a honeyfile for the file system automatically 2410, simulating users who manipulate with the honeyfile to modify content of the honeyfile 2420, saving the modified honeyfile to the file system 2430, and, optionally, deleting the modified honeyfile from the file system 2440.

In embodiments, the simulating users includes implementing a user agent on the file system; and running the user agent on a trained model to automatically manipulate the honeyfile to modify content of the honeyfile.

Figure 25:
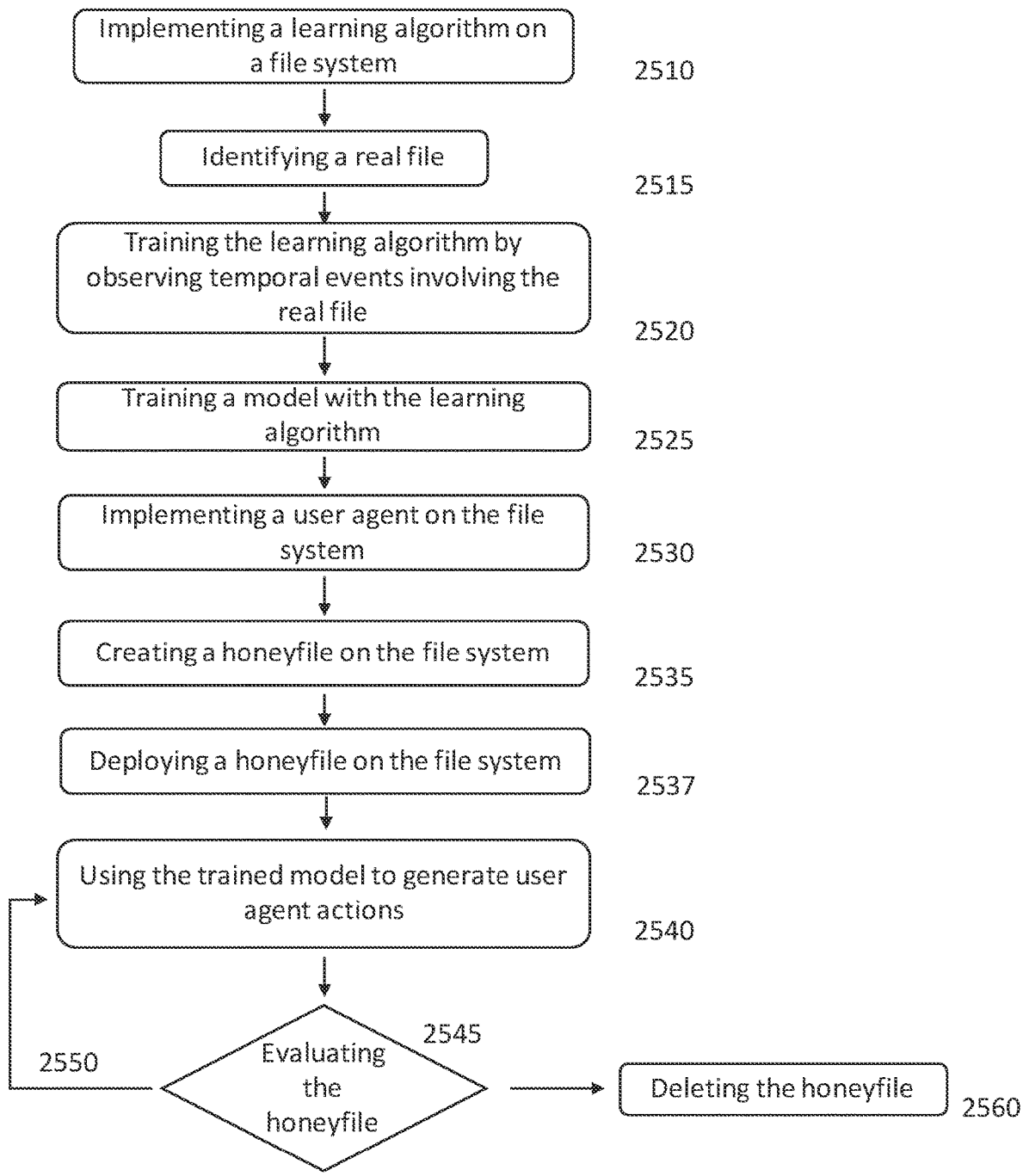
FIG. 25 is process flow diagram for the manipulation of the lifecycle of honeyfiles for a file system process according to a preferred embodiment of the present invention.

In a preferred embodiment, the manipulation of the lifecycle of honeyfiles for a file system process follows the process flow chart in FIG. 25. The steps manipulation of the lifecycle of honeyfiles for a file system include implementing a learning algorithm on a file system 2510, identifying a real file 2515, training the learning algorithm by observing temporal events involving the real file 2520, training a model with the learning algorithm 2525, implementing user agent on the file system 2530, creating a honeyfile on the file system 2535, deploying a honeyfile on the file system 2537, using the trained model to generate user agent actions to automatically modify the honeyfile 2540, evaluating the honeyfile 2545, and either re-using the trained model to generate user agent actions to automatically modify the honeyfile 2550, or deleting the honeyfile 2560. In embodiments, after evaluating the honeyfile 2545, the steps of manipulation of the lifecycle of honeyfiles for a file system may include leaving the honeyfile unchanged.

In embodiments, implementing a learning algorithm on a file system 2510 includes loading an algorithm or computer implementable method on a file system.

In embodiments, identifying a real file 2515 includes surveying a file set of the file system to identify tokenizable data in a file. Files with tokenizable data may be identified as real files.

In embodiments, training the learning algorithm by observing temporal events involving the real file 2520 that has been identified in step 2515 includes causing the learning algorithm to observe the types of temporal events that a real user performs on the real file, as well as time durations between the temporal events.

In embodiments, training a model with the learning algorithm 2525 includes training a model to modify and/or manipulate honeyfiles similarly to how real users modify real files.

In embodiments, implementing user agent on the file system 2530 includes automatically initiating a user agent on the file system, such that the user agent is associated with the trained model.

In embodiments, creating a honeyfile on the file system 2535 includes having the user agent create a honeyfile on the file system. The created honeyfile will be of the same type as the real file that is identified at step 2515.

In embodiments, deploying the honeyfile on the file system includes the processes outlined in FIGS. 2 and 3. Once deployed, the honeyfile is then located on the file system 370, and the honeyfile may be automatically modified (as described below), retired 375 (where its lifespan has ended), updated 385 (e.g., in order to maintain fidelity with surrounding data on the file system) or redeployed 395 (e.g., where its lifespan ended, however there is still a need for it).

In embodiments, using the trained model to generate user agent actions to automatically modify the honeyfile 2540 includes running the user agent with minimal or no user interaction.

In embodiments, evaluating the honeyfile 2545 includes the user agent automatically evaluating the honeyfile based on criteria which are discussed elsewhere in specification. In particular, evaluating the honeyfile includes at least one or more of the following: how well camouflaged is the file; how attractive is the file to the intruder; or how much sensitive content is exposed. Depending on the results of the evaluation step 2545, a honeyfile either may be deleted 2560, or may be modified automatically by the user agent 2540.

In embodiments, either re-using the trained model to generate user agent actions to automatically modify the honeyfile 2550, or deleting the honeyfile 2560 involves the user agent performing one of the steps 2550 or 2560 based on the decision of the user agent in the previous step 2545. Re-using the trained model to generate user agent actions to automatically modify the honeyfile 2550 includes returning to step 2540. Following re-using the trained model to generate user agent actions to automatically modify the honeyfile 2550, the honeyfile is automatically reevaluated in step 2545. Evaluating the honeyfile 2545 is described above.

General/Interpretation

It will be appreciated by those skilled in the art that many modifications and variations may be made to the embodiments described herein without departing from the spirit or scope of the invention. More particularly, the implementations described above with reference to the process flow diagrams in FIGS. 1-3, 11, 16, 17, and 23-25 and include operations and/or process flows which may be removed, modified and/or added to yet still fall within the scope of the invention.

Furthermore, functionality may be added or deleted from the process flow diagrams and operations may be interchanged among functional blocks. Steps may be added or deleted to methods described within the scope of the present invention.

A 'honeyfile', without limitation, may include a file which has the structure (e.g. layout of content, or sectioning, amongst other things), content (e.g. the substance of text or images forming the content of the file, amongst other things), metadata, and/or filename, created in accordance with the methods or systems disclosed herein. A 'honeyfile' may also be a file which is packaged, deployed and/or managed in any manner consistent with the methods or systems described in the subject application.

The word 'connect', 'couple' and similar terms do not necessarily denote direct and immediate connections, but also include connections through intermediate elements or devices.

Throughout the specification the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

An algorithm or computer implementable method is here, and generally, considered to be a self-consistent sequence of acts or operations leading to a desired result and examples may be provided in flow charts with steps noted therein. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as, values, elements, terms, numbers or the like.

Unless specifically stated otherwise, use of terms throughout the specification such as "computing", "calculating", "determining", "resolving" or the like, refer to the action and/or processes of a computer or computing system, or similar numerical calculating apparatus, that manipulate and/or transform data represented as physical, such as electronic, quantities within the computing system's registers and/or memories into other data similarly represented as physical quantities within the computing system's memories, registers or other such data storage, transmission or display devices. It should be understood, however, that all of these and similar terms are to be associated with the appropriate physical quantities and are merely convenient labels applied to these quantities.

Various operations may be described as multiple discrete operations in turn, in a manner that may be helpful in understanding embodiments of the present invention; however, the order of description should not be construed to imply that these operations are order dependent.

As used herein, a "computer", "computer system" or "computer-based system" comprises an input device for receiving data, an output device for outputting data in tangible form (e.g. printing or displaying on a computer screen), a permanent memory for storing data as well as computer code, and a processor (e.g. microprocessor) for executing computer code wherein said computer code resident in said permanent memory will physically cause said processor to read-in data via said input device, process said data within said processor and output said processed data via said output device.

Those of skill would further appreciate that the various illustrative logical blocks, modules, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, an external bus may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, display port, or any other form. This may include laptop or desktop computers, and may also include portable computers, including cell phones, tablets and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non-transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a web site. The website can be operated on a server computer, or operated locally, e.g., by being downloaded to the client computer, or operated via a server farm. The website can be accessed over a mobile phone or a tablet, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Python or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

In the present specification, terms such as "component", "item", "element", "means", "device" and "member" may refer to singular or plural items and are terms intended to refer to a set of properties, functions or characteristics performed by one or more items having one or more parts. It is envisaged that where a "component", "item", "element", "means", "device" or "member" or similar term is described as being a unitary object, then a functionally equivalent object having multiple components is considered to fall within the scope of the term, and similarly, where a "component", "item", "element", "means", "device" or "member" is described as having multiple items, a functionally equivalent but unitary object is also considered to fall within the scope of the term, unless the contrary is expressly stated or the context requires otherwise.

The mere disclosure of a method step or system component or operation in the specification should not be construed as being essential to the invention claimed herein, expect where it is either expressly stated to be so, or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor the abstract of the present application is to be taken as limiting in any way the scope of the claimed invention.

Where the preamble of a claim recites a purpose, benefit or possible use of the claimed invention, it does not limit the claimed invention to having only that purpose, benefit of possible use.

The invention claimed is:

1. A method for automatically modifying honeyfiles for a file system, comprising:
 implementing a user agent on the file system;
 training models of user behavior on the file system by
  observation of real files on the file system, wherein:

interactions with real files are temporal events;
the temporal events are selected from a list comprising at least: create; copy; add content; delete content; and add comment; and
a time between the temporal events is sampled;
providing simple exclusion rules; and
using the trained models to generate user agent actions that automatically modify honeyfiles for a file system, wherein the modifications to the honeyfiles comprise at least one of:
creating multiple draft versions of honeyfiles;
copying files;
deleting files;
adding content in files;
deleting content in files;
replacing content in files; and
adding comments to files.

2. The method of claim 1, wherein:
the adding content in files uses text generation methods to add topical content;
the replacing content in files uses text replacement methods to replace topical content; and
deleting content in files uses text deletion methods to delete topical content.

3. The method of claim 1, wherein the modifications to the honeyfiles further comprises simulating having multiple users interact with a file.

4. The method of claim 3, wherein the multiple users comprise simulated system users who are simulated to read a honeyfile.

5. The method of claim 3, wherein the multiple users comprise simulated multiple authors who are simulated to modify a honeyfile.

6. The method of claim 1, wherein the time between the temporal events is sampled, comprises:
observing the temporal events;
estimating parameters of a temporal distribution based on the observed temporal events; and
sampling the temporal distribution to determine the time for the user agent to automatically modify honeyfiles for a file system.

7. The method of claim 1, wherein the time between the temporal events is sampled from a Poisson distribution.

8. The method of claim 1, wherein the simple exclusion rules comprise not modifying honeyfiles that do not exist.

9. The method of claim 1, wherein the modifications to the honeyfiles cause the honeyfile metadata to be modified.

10. A method of manipulating a lifecycle of honeyfiles for a file system, comprising:
creating a honeyfile for the file system automatically;
simulating users who manipulate with the honeyfile to modify content of the honeyfile;
saving the modified honeyfile to the file system.

11. The method of claim 10, wherein following the saving the modified honeyfile to the file system, further comprising:
deleting the modified honeyfile from the file system.

12. The method of claim 10, wherein the simulating users comprises:
implementing a user agent on the file system; and
running the user agent on a trained model to automatically manipulate the honeyfile to modify content of the honeyfile.

13. The method of claim 10, wherein modifying the content of the honeyfile comprises at least one of:
creating multiple draft versions of honeyfiles;
copying files;
deleting files;
adding content in files;
deleting content in files;
replacing content in files; and
adding comments to files.

14. The method of claim 12, wherein the trained model is trained by:
observing interactions with real files as temporal events;
sampling the temporal events from a list of temporal events comprising at least: create; copy; add content; delete content; and add comment; and
sampling a time between the temporal events.

15. A method of automatically manipulating a lifecycle of a honeyfile on a file system, comprising:
implementing a learning algorithm on a file system;
identifying a real file;
training the learning algorithm by observing temporal events involving the real file;
training a model with the learning algorithm;
implementing a user agent on the file system;
creating a honeyfile on the file system;
deploying the honeyfile on the file system;
using the trained model to generate user agent actions;
evaluating the honeyfile; and
either:
deleting the honeyfile; or
re-using the trained model to generate user agent actions to automatically modify the honeyfile.

16. The method of claim 15, wherein automatically training the learning algorithm by observing temporal events involving the real file comprises causing the learning algorithm to observe:
the types of temporal events that a real user performs on the real file; and
the time durations between the temporal events that a real user performs on the real file.

17. The method of claim 15, wherein automatically modifying the honeyfile comprises at least one of modifying the content of the honeyfile or simulating having multiple users interact with a file.

18. The method of claim 15, wherein evaluating the honeyfile comprises at least one or more of: how well camouflaged is the file; how attractive is the file to the intruder; or how much sensitive content is exposed.

19. The method of claim 17, wherein simulating having multiple users interact with a file comprises generating a typical number of automatic modifications for normal workdays, evenings, and weekends.

20. A system for automatically modifying honeyfiles for a file system, comprising:
a server connected via an electronic communications network to a file system of at least one user device, the server:
comprising:
a processor/controller;
a database including a file set; and
an interface; and
configured to execute the steps of:
implementing a user agent on a system;
training models of user behavior on the system, wherein:
interactions with files are temporal events;
the temporal events are sampled from a list comprising at least: create; copy; add content; delete content; and add comment; and
a time between the temporal events is sampled;

providing simple exclusion rules; and running the user agent on the trained user behavior model to automatically modify honeyfiles for a file system; wherein the modifications to the honeyfiles comprise at least one of:
creating multiple draft versions of honeyfiles;
copying files;
deleting files;
adding content in files;
deleting content in files;
replacing content in files; and
adding comments to files.

* * * * *